US012548932B2

(12) United States Patent
Wang et al.

(10) Patent No.: US 12,548,932 B2
(45) Date of Patent: Feb. 10, 2026

(54) CONDUCTOR STRUCTURE AND ELECTRICAL CONNECTION MODULE

(71) Applicant: SHANGHAI•AEROSPACE•SCIENCE & INDUSTRY•APPLIANCE•CO., LTD, Shanghai (CN)

(72) Inventors: Xu Wang, Shanghai (CN); Tengfei Zeng, Shanghai (CN); Jian Wang, Shanghai (CN); Jun Wang, Shanghai (CN); Zimin Zhang, Shanghai (CN)

(73) Assignee: SHANGHAI AEROSPACE SCIENCE & INDUSTRY APPLIANCE CO., LTD, Shanghai (CN)

( * ) Notice: Subject to any disclaimer, the term of this patent is extended or adjusted under 35 U.S.C. 154(b) by 355 days.

(21) Appl. No.: 18/249,178

(22) PCT Filed: Jul. 29, 2021

(86) PCT No.: PCT/CN2021/109246
§ 371 (c)(1),
(2) Date: Apr. 14, 2023

(87) PCT Pub. No.: WO2022/252377
PCT Pub. Date: Dec. 8, 2022

(65) Prior Publication Data

US 2023/0411887 A1 Dec. 21, 2023

(30) Foreign Application Priority Data

May 31, 2021 (CN) ......................... 202110603379.5
Jul. 1, 2021 (CN) ......................... 202110747507.3

(51) Int. Cl.
*H01R 13/11* (2006.01)
*H01R 12/70* (2011.01)
(Continued)

(52) U.S. Cl.
CPC ........... *H01R 13/11* (2013.01); *H01R 12/707* (2013.01); *H01R 12/737* (2013.01); *H01R 13/533* (2013.01)

(58) Field of Classification Search
CPC .... H01R 13/11; H01R 13/533; H01R 12/707; H01R 12/737
(Continued)

(56) References Cited

U.S. PATENT DOCUMENTS 10,971,839 B1 4/2021 Kuo et al.
2007/0202729 A1 8/2007 Uesaka
(Continued)

FOREIGN PATENT DOCUMENTS

CN 1172365 A 2/1998
CN 202103202 U 1/2012
(Continued)

OTHER PUBLICATIONS

Japanese Decision to Grant Patent (w/ English translation) for corresponding Application No. 2023-524735, mailed Aug. 27, 2024, 4 pages.
(Continued)

*Primary Examiner* — Peter G Leigh
(74) *Attorney, Agent, or Firm* — Dority & Manning, PA

(57) ABSTRACT

A welding foot portion of an conductor structure is welded with a circuit board; a back bending structure and a bending structure which are connected to each other are formed at a middle bending portion of the conductor structure; a first interference area and a second interference area are provided; a sliding insertion portion of the conductor structure is configured to be connected to a plug conductor of a plug connector; the back bending structure and the bending structure of the conductor structure are configured to be exposed between a socket lower shell and a socket upper
(Continued)

shell in a floating mode when the first interference area is in close contact with the socket lower shell and the second interference area is in close contract with the socket upper shell.

16 Claims, 15 Drawing Sheets

(51) Int. Cl.
*H01R 12/73* (2011.01)
*H01R 13/533* (2006.01)

(58) Field of Classification Search
USPC ........................................................... 439/65
See application file for complete search history.

(56) References Cited

U.S. PATENT DOCUMENTS

| | | | | |
|---|---|---|---|---|
| 2015/0044919 | A1* | 2/2015 | Kimura | H01R 12/85<br>439/862 |
| 2017/0170588 | A1* | 6/2017 | Doi | H01R 12/91 |
| 2018/0138618 | A1 | 5/2018 | Hasegawa | |
| 2019/0181573 | A1* | 6/2019 | Horino | H01R 12/716 |
| 2019/0296492 | A1* | 9/2019 | Kakino | H01R 13/6464 |
| 2020/0083642 | A1 | 3/2020 | Chen | |

FOREIGN PATENT DOCUMENTS

| | | | | | |
|---|---|---|---|---|---|
| CN | 202363639 | U | | 8/2012 | |
| CN | 202550167 | U | | 11/2012 | |
| CN | 203445293 | U | | 2/2014 | |
| CN | 204088670 | U | | 1/2015 | |
| CN | 106299783 | A | | 1/2017 | |
| CN | 108075268 | A | | 5/2018 | |
| CN | 207442027 | U | | 6/2018 | |
| CN | 110112614 | A | | 8/2019 | |
| CN | 110112615 | A | * | 8/2019 | |
| CN | 209344360 | U | | 9/2019 | |
| CN | 209709290 | U | * | 11/2019 | |
| CN | 110896178 | A | | 3/2020 | |
| CN | 110970747 | A | | 4/2020 | |
| CN | 210668799 | U | * | 6/2020 | |
| CN | 111446567 | A | | 7/2020 | |
| CN | 212626156 | U | | 2/2021 | |
| CN | 112701502 | A | | 4/2021 | |
| CN | 113346285 | A | | 9/2021 | |
| CN | 113594777 | A | | 11/2021 | |
| EP | 3633797 | A1 | | 4/2020 | |
| EP | 3916924 | A2 | | 12/2021 | |
| EP | 4102649 | A1 | | 12/2022 | |
| JP | 2012129109 | A | * | 7/2012 | |
| JP | 2014222576 | A | * | 11/2014 | |
| JP | 2014225469 | A | * | 12/2014 | |
| JP | 2018078079 | A | | 5/2018 | |
| JP | 6438382 | B2 | * | 12/2018 | H01R 12/7005 |
| JP | 2019067765 | A | | 4/2019 | |
| JP | 2021022488 | A | | 2/2021 | |
| WO | WO-2019181462 | A1 | * | 9/2019 | |
| WO | WO-2020179348 | A1 | * | 9/2020 | |

OTHER PUBLICATIONS

Intention to Grant received in Application No. CN 202110747507.3, dated Jul. 27, 2022, 4 pages.
International Search Report and Written Opinion (with English translation) received in Application No. PCT/CN2021/109246, dated Feb. 28, 2022, 6 pages.
Office Action received in Application No. CN 202110747507.3, dated Jan. 26, 2022, 8 pages.
Office Action received in Application No. CN 202110747507.3, dated Jun. 24, 2022, 6 pages.
Japanese Office Action (w/ English translation) for corresponding Application No. 2023-524735, dated Apr. 16, 2024, 8 pages.
Extended European Search Report for corresponding Application No. 21943733, dated May 29, 2024, 12 pages.

* cited by examiner

CONDUCTOR STRUCTURE AND ELECTRICAL CONNECTION MODULE

CROSS REFERENCE TO RELATED APPLICATION

The present application is a US national phase of International Patent Application No. PCT/CN2021/109246, filed on Jul. 29, 2021, which, in turn, is based on and claims priorities to Chinese Patent Application with No. 202110603379.5 and filed on May 31, 2021, and Chinese Patent Application with No. 202110747507.3 and filed on Jul. 1, 2021, the contents of all of which are expressly incorporated herein by reference in their entirety.

TECHNICAL FIELD

The present disclosure relates to the field of board-to-board connection, and particularly to a conductor structure and an electrical connection module.

BACKGROUND

A board-to-board connector is a miniature coupling plug and socket that can directly connect power supplies and signals between printed circuit boards through the pins of the connector. With the rapid development of electronic products, board-to-board connectors are widely used in consumer, industrial control, automobile, medical, communication and many other fields. With the development of miniaturization and integration of electronic equipment in these fields, more and more functional modules are integrated into a limited space. Therefore, the application environment of these modules is becoming more and more complex, often including a high temperature, a complex vibration environment, a large processing error environment, etc. When different circuit boards implement power supply or signals intercommunication, the complex application environment often allows the conductor of the connector to suffer from more strength and stress than the connector material itself can withstand, which may cause the transient interruption of the electrical signal of the connector or performance degradation or destruction of the material itself of the connector.

In addition to the complex and changeable application scenarios and multi-module integration, the development trend of the electronic products also shows the phenomenon that the signals used are developing to 10 Gbps or even higher frequencies, which requires a higher transmission speed for the connector in the connection scenario using the board-to-board connector, that is, the transmission speed of the connector in the connection scenario of the board-to-board connector has also become one of the important factors for the system to realize its functions.

The conventional board-to-board connector does not have the stable electrical connection capability when the center of the plug interface of the plug connector and the socket connector are offset more than ±0.2 mm. Therefore, if the conventional board-to-board connector is employed to work in a high-vibration environment, or when the contact area is used in a low-temperature environment below minus 20° C. or a high-temperature environment above 85° C., it will cause a data transmission failure and even damage to the connector, etc. In application scenarios such as traveling of an automobile at a high speed on a bumpy road, rapid CT scanning, and interconnection of ultrasonic probes between multi-layer boards, etc., it is very easy for the electrical connection in the contact area to be disconnected instantaneously, accordingly there is a safety risk and it is easy to cause accidents.

SUMMARY

According to various embodiments of the present disclosure, it is necessary to provide a conductor structure and an electrical connection module.

A conductor structure includes a weld leg portion, an intermediate curved portion, and a sliding insertion portion connected in sequence;

- the weld leg portion is welded with a circuit board;
- the intermediate curved portion is formed with a back-bending structure and a curved structure which are connected, the intermediate curved portion is provided with a first interference region adjacent to the weld leg portion, the first interference region is configured to be in close contact with a socket lower housing body to fix the socket lower housing body;
- the sliding insertion portion is configured to conduct with a plug conductor of a plug connector, the sliding insertion portion is provided with a second interference region adjacent to the intermediate curved portion, the second interference region is configured to be in close contact with a socket upper housing body to fix the socket upper housing body;
- the back-bending structure and the curved structure are configured to be floatingly exposed between the socket lower housing body and the socket upper housing body when the first interference region is in close contact with the socket lower housing body and the second interference region is in close contact with the socket upper housing body.

When the above-mentioned conductor structure is applied to the board-to-board connection, the weld leg portion is welded and fixed, and the sliding insertion portion is detachably fixed relatively. The socket upper housing body and the socket lower housing body of the socket connector are fixed on the conductor structure by means of two interference regions. On the one hand, the double vibration reductions of the back-bending structure and the curved structure are cleverly designed, which is adapted to a high vibration environment. On the other hand, since the material of the conductor structure itself has the capability to deform, even if a center position during the board-to-board connection has an offset within a preset range, the effective connection and conduction of the conductor structure and the plug conductor can still be effectively guaranteed. On the other hand, due to the simple structure of the conductor structure, the conductor structure is adapted to operate in certain low temperature environment and a high temperature environment.

In an embodiment, the weld leg portion, the intermediate curved portion and the sliding insertion portion are formed in one piece; and/or,

- the intermediate curved portion has an R shape or has a R-shaped stretching deformation.

In an embodiment, the intermediate curved portion is provided with at least one discharge hole.

In an embodiment, the weld leg portion, the intermediate curved portion and the sliding insertion portion have the same thickness.

In an embodiment, the intermediate curved portion is sequentially provided with a first straight segment, a second curved segment, a third straight segment, a fourth curved segment, a fifth straight segment, a sixth curved segment, a seventh straight segment, an eighth curved segment, and a ninth straight segment;

the first straight segment is connected to the weld leg portion, the first straight segment is provided with the first interference region;

the second curved segment, the third straight segment, the fourth curved segment, the fifth straight segment, and the sixth curved segment jointly form the back-bending structure;

the seventh straight segment, the eighth curved segment, and the ninth straight segment jointly form the curved structure;

the ninth straight segment is connected to the sliding insertion portion.

In an embodiment, an extension direction of the first straight segment is parallel to an extension direction of the sliding insertion portion.

In an embodiment, a first angle $\alpha$ is formed between the extension direction of the first straight segment and the extension direction of the weld leg portion;

a second included angle $\beta$ is formed between an extension direction of the ninth straight segment and an extension direction of the sliding insertion portion;

a third included angles $\gamma$ is formed between the extension direction of the first straight segment and an extension direction of the third straight segment at the second curved segment;

a fourth included angle $\delta$ is formed between an extension direction of the fifth straight segment and an extension direction of the seventh straight segment at the sixth curved segment;

a fifth included angle $\varepsilon$ is formed between the extension direction of the seventh straight segment and the extension direction of the ninth straight segment at the eighth curved segment; and the first included angle $\alpha$ is greater than or equal to 90 degrees, and the second included angle $\beta$ is greater than or equal to 90 degrees, the third included angle $\gamma$ is greater than 90 degrees, the fourth included angle $\delta$ is greater than or equal to 90 degrees, and/or, the fifth included angle $\varepsilon$ is greater than or equal to 90 degrees.

In an embodiment, the first straight segment, the third straight segment, the fifth straight segment, the seventh straight segment and/or the ninth straight segment are provided with at least one width or thickness variation adjustment portion with respect to the second curved segment, the fourth curved segment, the sixth curved segment and/or the eighth curved segment.

In an embodiment, the intermediate curved portion is provided with a shape variation region at a position where the straight segment is adjacent to the curved segment, the shape variation region includes a width variation region and/or a thickness variation region.

In an embodiment, the first straight segment, the second curved segment, the third straight segment, the fourth curved segment, the fifth straight segment, the sixth curved segment, the seventh straight segment, the eighth curved segment, and the ninth straight segment are formed in one piece; and/or the first straight segment, the second curved segment, the third straight segment, the fourth curved segment, the fifth straight segment, the sixth curved segment, the seventh straight segment, the eighth curved segment, and the ninth straight segment have the same thickness.

In an embodiment, a centerline (PQ) of the back-bending structure is inclined to the extension direction (VW) of the sliding insertion portion.

In an embodiment, the back-bending structure and the curved structure are located in different planes.

In an embodiment, the back-bending structure deviates from a plane jointly formed by the first straight segment and the weld leg portion and is twisted with respect to the plane.

In an embodiment, the sliding insertion portion is provided with a connection segment and an insertion segment which are connected, the connection segment is connected to the intermediate curved portion and is adjacent to the curved structure, the connection segment is provided with the second interference region, the insertion segment is configured to conduct with the plug conductor of the plug connector.

In an embodiment, the width of the sliding insertion portion is less than or equal to a maximum width of the intermediate curved portion, the insertion segment is arranged higher than the intermediate curved portion, the weld leg portion is arranged lower than the connection segment and the intermediate curved portion.

In an embodiment, widths of the first interference region and the second interference region are less than or equal to a maximum width of the intermediate curved portion.

In an embodiment, an electrical connection module includes a socket connector provided with a socket lower housing body, a socket upper housing body, and the conductor structure in any one of the above-mentioned embodiments.

In an embodiment, the electrical connection module further includes a plug connector matching the socket connector, wherein the plug connector is connected to the conductor structure; and/or a plurality of the conductor structures are regularly arranged in two groups, the first interference region of each conductor structure in each group is configured to be in close contact with the socket lower housing body to integrally fit and fix the socket lower housing body; the second interference region of each conductor structure in each group is configured to be in close contact with the socket upper housing body to integrally fit and fix the socket upper housing body.

BRIEF DESCRIPTION OF THE DRAWINGS

In order to illustrate the technical solution of the embodiments of the present disclosure or the conventional technology more clearly, the accompanying drawings used in the description of the embodiments or the conventional technology will be briefly introduced. Obviously, the accompanying drawings in the following description are merely some embodiments of the present disclosure, and those skilled in the art can also obtain other drawings based on these drawings without creative work.

REFERENCE SIGNS

Figure 1:
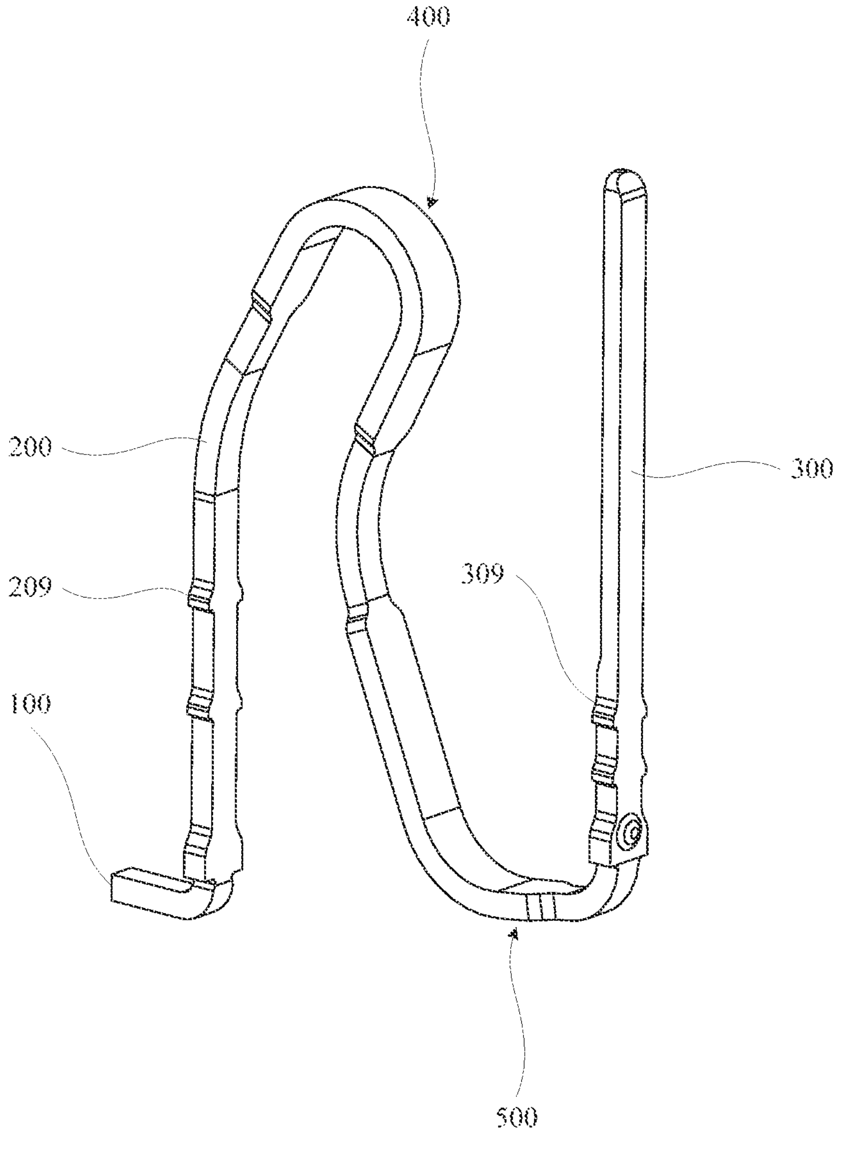
FIG. 1 is a schematic structure diagram of a conductor structure according to an embodiment of the present disclosure.

- 100, weld leg portion; 200, curved portion; 300, sliding insertion portion; 400, back-bending structure; 500, curved structure; 600, conductor structure; 700, socket lower housing body; 800, socket upper housing body; 900, circuit board; 910, installation reinforcement buckle;
- 101, bending region; 210, first straight segment; 220, second curved segment; 230, third straight segment; 240, fourth curved segment; 250, fifth straight segment 250; 260, sixth curved segment; 270, seventh straight segment; 280, eighth curved segment; 290, ninth straight segment;
- 201, first interference portion; 202, second interference portion; 203, third interference portion; 204, fourth interference portion; 205, fifth interference portion; 206, sixth interference portion; 208, discharge hole; 209, first interference region;
- 310, connection segment; 320, insertion segment; 330, positioning hole; 331, positioning convex portion; 301, transition region; 309, second interference region;
- 401, first variation region; 402, second variation region; 403, third variation region; 404, fourth variation region; 405, fifth variation region; 406, sixth variation region; 407, seventh variation region; 501, eighth variation region; 502, ninth variation region; 503, tenth variation region;
- α, first included angle; β, second included angle; γ, third included angle; δ, fourth included angle; ε, fifth included angle.

DETAILED DESCRIPTION

In order to make the above-mentioned purpose, features and advantages of the present disclosure more obvious and understandable, specific embodiments of the present disclosure will be detailed below with reference to the accompanying drawings. In the following description, the specific details are set forth in order to provide a thorough understanding of the present disclosure. However, the present disclosure can be implemented in many other manners different from those described here, and those skilled in the art can make similar improvements without departing from the concept of the present disclosure, so that the present disclosure is not limited to the specific embodiments disclosed below.

It should be noted that when a component is referred to as being "fixed on" or "provided on" another component, it may be directly on the other component or there may also be an intermediate component. When a component is referred to as being "connected" to another component, it may be directly connected to the other component or there may be an intermediate component at the same time. The terms "vertical", "horizontal", "upper", "lower", "left", "right" and other similar expressions used in the description of the present disclosure are only for the purpose of illustration and do not represent the unique implementation mode.

In addition, the terms "first" and "second" are merely used for descriptive purposes, and cannot be interpreted as indicating or implying relative importance or implicitly specifying the quantity of indicated technical features. Thus, the features defined as "first" and "second" may explicitly or implicitly include at least one of these features. In the description of the present disclosure, "plurality" means at least two, such as two, three, etc., unless otherwise specifically defined.

In the present disclosure, unless otherwise clearly specified and limited, a first feature is "on" or "under" a second feature, which means that the first feature is directly in contact with the second feature, or that the first feature and the second feature are indirectly contact through an intermediary. Moreover, the first feature is "on", "above" or "on top of" the second feature, it may mean that the first feature is directly above or obliquely above the second feature, or it just means that the first feature is higher in level than the second feature. The first feature is "below", "beneath" or "under" the second feature, it may mean that the first feature is directly below or obliquely below the second feature, or it just means that the first feature is lower in level than the second feature.

Unless otherwise defined, all technical and scientific terms used in the description of the present disclosure have the same meaning as commonly understood by those skilled in the art of the present disclosure. The terms used in the description of the present disclosure are merely for the purpose of describing specific embodiments, and are not intended to limit the present disclosure. The term "and/or" used in the description of the present disclosure includes any and all combinations of one or more related listed items.

In an embodiment of the present disclosure, a conductor structure is provided, which includes a weld leg portion, a middle curve portion, and a sliding insertion portion connected in sequence. The weld leg portion is welded with a circuit board. The intermediate curved portion is formed with a back-bending structure and a curved structure which are connected. The intermediate curved portion is provided with a first interference region adjacent to the weld leg portion; and the first interference region is configured to be in close contact with a socket lower housing body to fix the socket lower housing body. The sliding insertion portion is configured to conduct with a plug conductor of a plug connector; and the sliding insertion portion is provided with a second interference region adjacent to the intermediate curved portion. The second interference region is configured to be in close contact with a socket upper housing body to fix the socket upper housing body. The back-bending structure and the curved structure are configured to be floatingly exposed between the socket lower housing body and the socket upper housing body when the first interference region is in close contact with the socket lower housing body and the second interference region is in close contact with the socket upper housing body. The above-mentioned conductor structure is applied to a board-to-board connection; the weld leg portion is welded and fixed, and the sliding insertion portion is detachably and relatively fixed to the plug connector by plugging in the plug connector. The socket lower housing body and the socket upper housing body of the socket connector are respectively fixed on the conductor structure through two interference regions. On the one hand, the double vibration reductions of the back-bending structure and the curved structure are cleverly designed, which is adapted to a high vibration environment. On the other hand, since the material of the conductor structure itself has the capability to deform, even if a center position during the board-to-board connection has an offset within a preset range, the effective connection and conduction of the conductor structure and the plug conductor can still be effectively guaranteed. On the other hand, due to the simple structure of the conductor structure, the conductor structure is adapted to operate in certain low temperature environment and high temperature environment.

In an embodiment, a conductor structure is provided, which includes part or all of the structures in the following embodiments; that is, the conductor structure includes some or all of the following technical features. Further, in an embodiment, the conductor structure includes a weld leg portion, an intermediate curved portion, and a sliding insertion portion connected in sequence. The weld leg portion is welded with a circuit board; the intermediate curved portion is at least partly floated. The sliding insertion portion is configured to conduct with a plug conductor of a plug connector. Such a design, since the intermediate curved portion is partially floated, a floated state is formed, that is, the intermediate curved portion is not in hard contact with other portions, which is conducive to the realization of cushioning and shock absorption in the high-vibration environment, and avoids a hard transmission of the vibration. Further, since the intermediate curved portion is also a part of the conductor structure, it is beneficial to adapt to a high vibration state in a certain low temperature environment and high temperature environment, thereby ensuring the accuracy of signal transmission, and avoiding the problem of packet loss in the transmission of a large amount of data, which is especially adapted to a high-speed signal transmission. In various embodiments, a vibration frequency of the high-vibration environment is not higher than 2000 Hz, and an acceleration is not higher than 150 $m/s^2$. The temperature of the above-mentioned low temperature environment is not be lower than −55° C. The temperature of the above-mentioned high temperature environment is not higher than +125° C. That is, the above-mentioned low and high temperature environments can be an application environment with a temperature of −55° C. to +125° C.

In order to facilitate the installation of the socket lower housing body of the socket connector, in an embodiment, the intermediate curved portion is provided with a first interference region adjacent to the weld leg portion; and the first interference region is configured to be in close contact with the socket lower housing body to fix the socket lower housing body. The sliding insertion portion is provided with a second interference region adjacent to the intermediate curved portion; the second interference region is configured to be in close contact with the socket upper housing body to fix the socket upper housing body. It should be appreciated that the above-mentioned fixation is relative, when the force exceeds the design limit, the first interference region is separated from the socket lower housing body, and the second interference region is separated from the socket upper housing body. Due to the single interference region including the first interference region and the second interference region, the force for fixation is limited. Therefore, in a specific application, a plurality of conductor structures are usually arranged regularly and used together. In an embodiment, the intermediate curved portion is formed with a back-bending structure and a curved structure connected. In an embodiment, the intermediate curved portion has an R shape or is deformed by stretching, and one of curved portions serves as the back-bending structure, and another curved portion serves as the curved structure. Further, in an embodiment, the back-bending structure and the curved structure are configured to be floatingly exposed between the socket lower housing body and the socket upper housing body when the first interference region is in close contact with the socket lower housing body and the second interference region is in close contact with the socket upper housing body, so that the back-bending structure and/or the curved structure in the high-vibration environment are arranged separately with respect to the socket lower housing body and the socket upper housing body. That is, the back-bending structure and the curved structure are indirectly connected to the socket lower housing body and the socket upper housing body through the first interference region and the second interference region respectively; and four relatively independent vibration regions are formed in the high-vibration environment. The four vibration regions include the socket lower housing body, the socket upper housing body, the back-bending structure and the curved structure. Through such a design, when the socket lower housing body and the socket upper housing body of the socket connector are respectively fixed onto the conductor structure, the back-bending structure and the curved structure form two floating states. The vibration from a position where the conductor structure is installed is first transmitted to the back-bending structure, then to the curved structure, and then to the plug connector; vice versa, the vibration from the plug connector is first transmitted to the sliding insertion portion and the socket upper housing body, then to the curved structure, then to the back-bending structure, then to the socket lower housing body and the weld leg portion, and finally to the position where the conductor structure is installed; that is, through the vibration damping and multiple dispersion of the back-bending structure and the curved structure with the two floating states, the vibration energy is greatly attenuated, so that it is beneficial to adapt to the high vibration state in a certain low temperature environment and high temperature environment. Because the material of the conductor structure itself has the capability to deform, even if a center position during the board-to-board connection has an offset within a preset range, it can still effectively ensure the effective connection and conduction of the conductor structure and the plug conductor (such as a plug signal conductor). In each embodiment, the preset range is within a circular space with a radius of 0.5 mm to 0.8 mm.

In order to improve the floating vibration damping effect, in an embodiment, the back-bending structure and the curved structure are located in different planes. In an embodiment, the intermediate curved portion is sequentially provided with a first straight segment, a second curved segment, a third straight segment, a fourth curved segment, a fifth straight segment, a sixth curved segment, a seventh straight segment, an eighth curved segment, and a ninth straight segment. The first straight segment is connected to the weld leg portion; the first straight segment is provided with the first interference region. The second curved segment, the third straight segment, the fourth curved segment, the fifth straight segment, and the sixth curved segment jointly form the back-bending structure. The seventh straight segment, the eighth curved segment, and the ninth straight segment jointly form the curved structure. The ninth straight segment is connected to the sliding insertion portion. In an embodiment, an extension direction of the first straight segment is parallel to an extension direction of the sliding insertion portion. Such design, on the one hand, is innovative in space, and can perform floating vibration damping from multiple directions and angles to release the vibration energy; on the other hand, the back-bending structure and the curved structure plug part are conducive to form the first straight segment and the sliding insertion portion which are parallel as a whole, to fit the socket upper housing body and the socket lower housing body to fix onto the conductor structure normatively.

In order to better improve the floating vibration damping effect, in an embodiment, a first angle $\alpha$ is formed between the extension direction of the first straight segment and the extension direction of the weld leg portion; a second included angle $\beta$ is formed between the extension direction of the ninth straight segment and the extension direction of the sliding insertion portion; a third included angles $\gamma$ is formed between the extension direction of the first straight segment and the extension direction of the third straight segment at the second curved segment; a fourth included angle $\delta$ is formed between the extension direction of the fifth straight segment and the extension direction of the seventh straight segment at the sixth curved segment; a fifth included angle $\varepsilon$ is formed between the extension direction of the seventh straight segment and the extension direction of the ninth straight segment at the eighth curved segment. Further, the first included angle $\alpha$ is greater than or equal to 90 degrees, and the second included angle $\beta$ is greater than or equal to 90 degrees, the third included angle $\gamma$ is greater than 90 degrees, the fourth included angle $\delta$ is greater than or equal to 90 degrees, and/or, the fifth included angle $\varepsilon$ is greater than or equal to 90 degrees. Further, in an embodiment, the fourth curved segment is semicircular or semielliptical. Such design standardizes various curved shapes of the intermediate curved portion, and ensures that the floating vibration damping structure formed by curving is adapted to a material yield strength of the conductor structure, to ensure the normally designed life of the product.

It can be appreciated that the connection between the plug connector and the socket connector may involve a large number of the conductor structures, each of which exists in a three-dimensional environment formed when the plug connector is connected to the socket connector. Therefore, in order to improve the floating vibration damping effect in the three-dimensional environment, in an embodiment, a centerline of the back-bending structure is inclined to the extension direction of the sliding insertion portion. In an embodiment, the centerline of the back-bending structure is inclined to the extension direction of the weld leg portion. In an embodiment, after extending a certain length with respect to the weld leg portion, the back-bending structure is bent toward the weld leg portion. In an embodiment, the back-bending structure deviates from and/or is twisted respect to a plane formed by the first straight segment and the weld leg portion. In an embodiment, the fourth curved segment deviates from or is twisted respect to the plane. Through such design, it is beneficial for each conductor structure to form multi-angle vibration damping directions in the three-dimensional space (for example, relative to the space rectangular coordinate system), and release vibration forces in different planes. Since the vibration is released in multiple positions of the conductor structure, the electrical contact is not easy to disengage, so that even if the center position during the board-to-board connection has an offset within a preset range, it can still effectively ensure the effective connection and conduction of the conductor structure and the plug conductor.

Starting from the direction to facilitate the release of the vibration energy, in an embodiment, the first straight segment, the third straight segment, the fifth straight segment, the seventh straight segment and/or the ninth straight segment are provided with at least one width or thickness variation adjustment portion with respect to the second curved segment, the fourth curved segment, the sixth curved segment and/or the eighth curved segment; and/or, the intermediate curved portion is provided with a shape variation region at a position where the straight segment is adjacent to the curved segment. The shape variation region includes a width variation region and/or a thickness variation region, that is, a width changes or a thickness changes. Furthermore, in an embodiment, the variation adjustment portion has a widened, thickened, narrowed or thinned structure. Such design additionally blocks the transmission of vibration at each variation adjustment portion and each shape variation region, which is conducive to the release of the vibration energy.

In order to facilitate the manufacture of the conductor structure, in an embodiment, the weld leg portion, the intermediate curved portion and the sliding insertion portion are formed in one piece. In an embodiment, the weld leg portion, the intermediate curved portion and the sliding insertion portion have the same thickness. Such design is conducive to rapid manufacture of a blank piece by overall punching and then bending and forming, which reduces the process, greatly improves the manufacturing efficiency, and reduces the cost. In an embodiment, the weld leg portion, the intermediate curved portion, and the sliding insertion portion are formed in one piece; the intermediate curved portion has an R shape or is deformed by stretching. In an embodiment, the centerline of the fourth curved segment intersects a plane formed by the extension direction of the first straight segment and the extension direction of the weld leg portion. In an embodiment, the fourth curved segment has a symmetrical structure and a centerline thereof intersects the plane; and/or, the first straight segment, the second curved segment, the third straight segment, the fourth curved segment, the fifth straight segment, the sixth curved segment, the seventh straight segment, the eighth curved segment, and the ninth straight segment are formed in one piece. In an embodiment, the first straight segment, the second curved segment, the third straight segment, the fourth curved segment, the fifth straight segment, the sixth curved segment, the seventh straight segment, the eighth curved segment, and the ninth straight segment have the same thickness. Such design is conducive to the production and manufacture of the conductor structure, and is also conducive to reducing the production cost of the conductor structure and improving the production efficiency.

In an embodiment, as shown in FIG. 1, a conductor structure includes a weld leg portion 100, an intermediate curved portion 200, and a sliding insertion portion 300 connected in sequence. The weld leg portion 100 is welded with a circuit board; the intermediate curved portion 200 is formed with a back-bending structure 400 and a curved structure 500 which are connected. The sliding insertion portion 300 is configured to conduct with a plug conductor of a plug connector. The intermediate curved portion 200 is provided with a first interference region 209 adjacent to the weld leg portion 100; the sliding insertion portion 300 is provided with a second interference region 309 adjacent to the intermediate curved portion 200. In the embodiment, the weld leg portion 100, the intermediate curved portion 200 and the sliding insertion portion 300 are formed in one piece.

Figure 2:
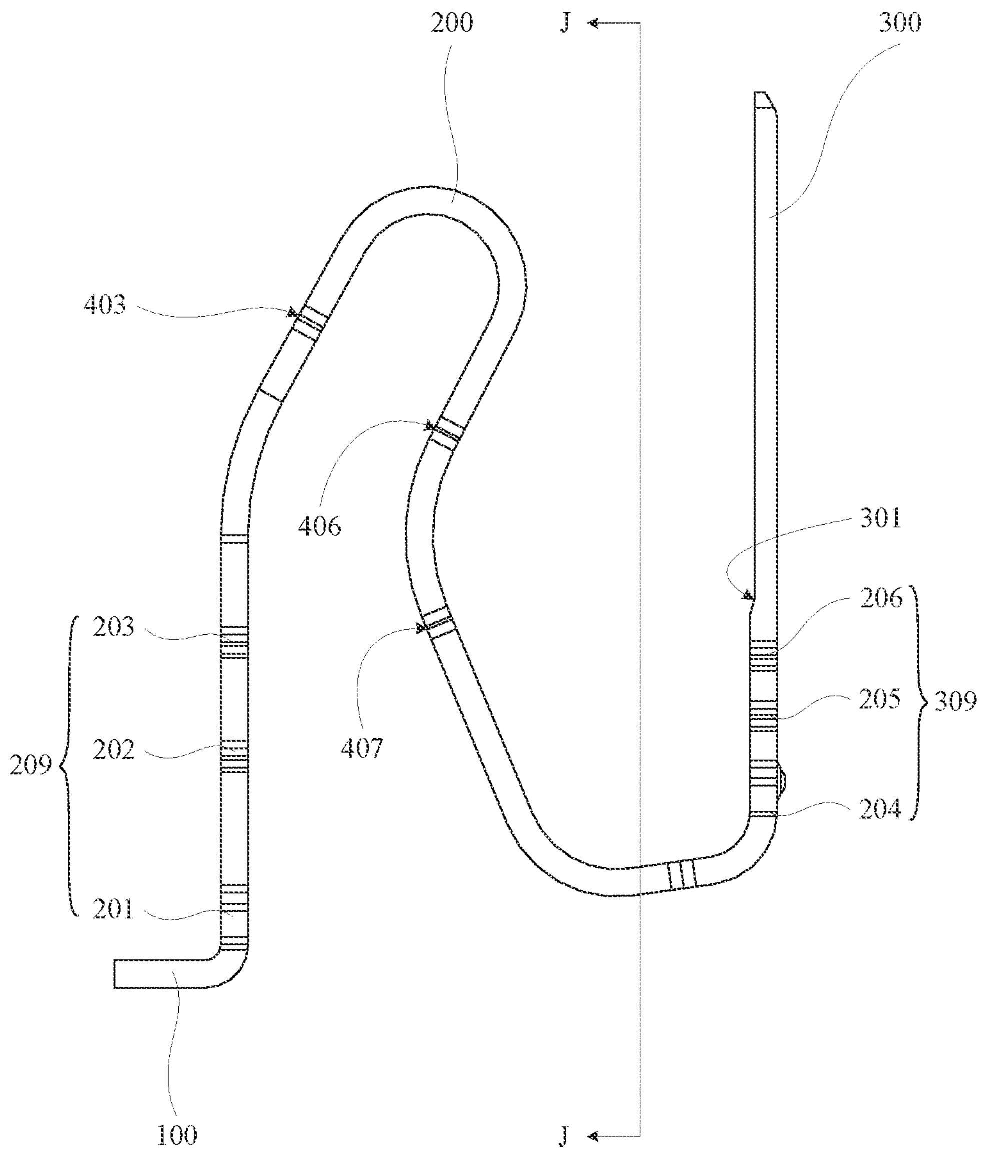
FIG. 2 is a schematic diagram of the conductor structure shown in FIG. 1 in another direction.

Referring to FIG. 2, the first interference region 209 includes a first interference portion 201, a second interference portion 202, and a third interference portion 20. The second interference region 309 includes a fourth interference portion 204, a fifth interference portion 205, and a sixth interfering position 206. The weld leg portion 100, the intermediate curved portion 200 and the sliding insertion portion 300 have the same thickness; or, in the embodiment, except that the sliding insertion portion 300 is provided with a transition region 301, and the transition region 301 forms a thickness variation region as a shape variation region, other portions have the same thickness.

Figure 3:
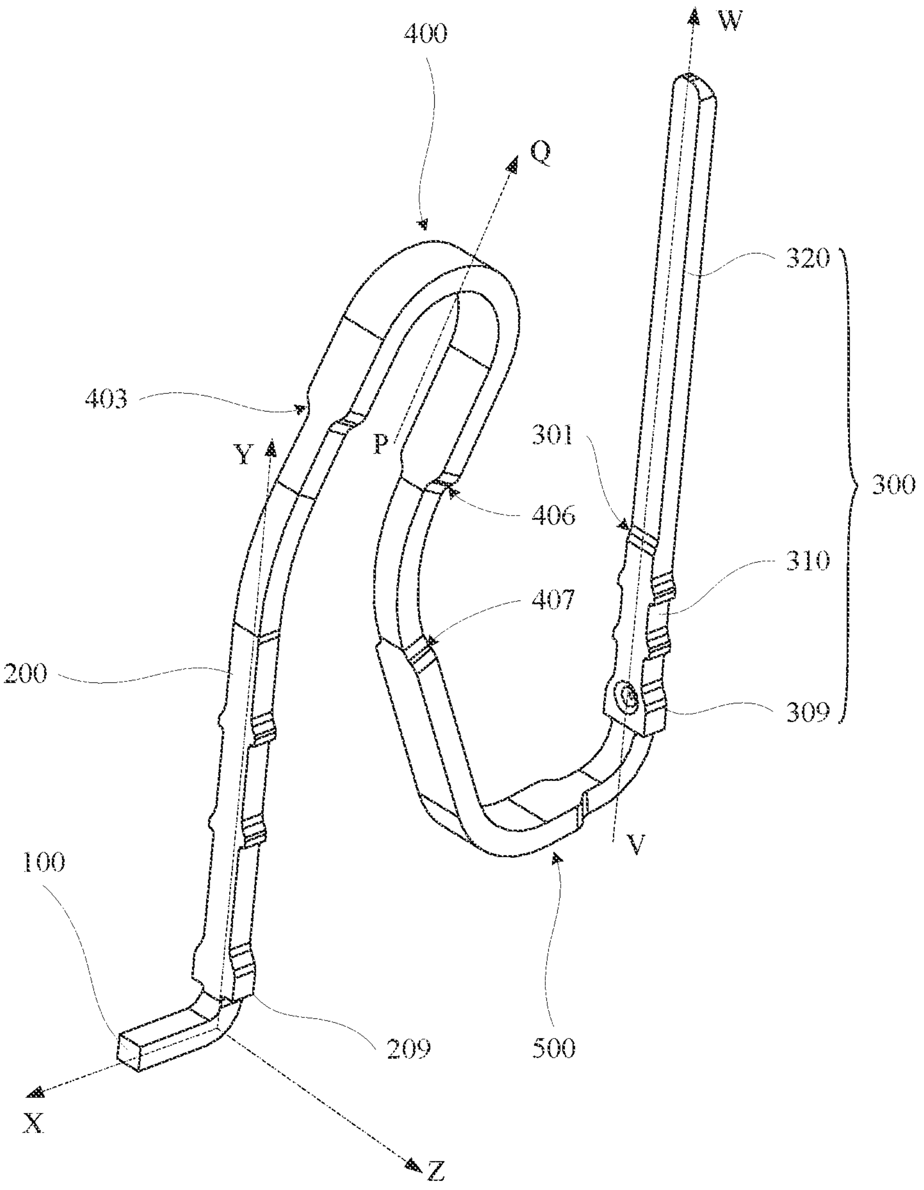
FIG. 3 is a schematic diagram of the conductor structure shown in FIG. 1 in another direction.

Referring to FIG. 3, the intermediate curved portion 200 is provided with a third variation region 403 and a sixth variation region 406 at the back-bending structure 400, and is provided with a seventh variation region 407 at the curved structure 500. The third variation region 403, the sixth variation region 406, and the seventh variation region 407 form a width variation region as a shape variation region.

Referring to FIG. 3, the sliding insertion portion 300 is provided with a connection segment 310 and an insertion segment 320 which are connected. The second interference region 309 is located on the connection segment 310; the insertion segment 320 is configured to conduct with the plug conductor of the plug connector, the connection segment 310 is connected to the intermediate curved portion 200 and is adjacent to the curved structure 500.

Figure 4:
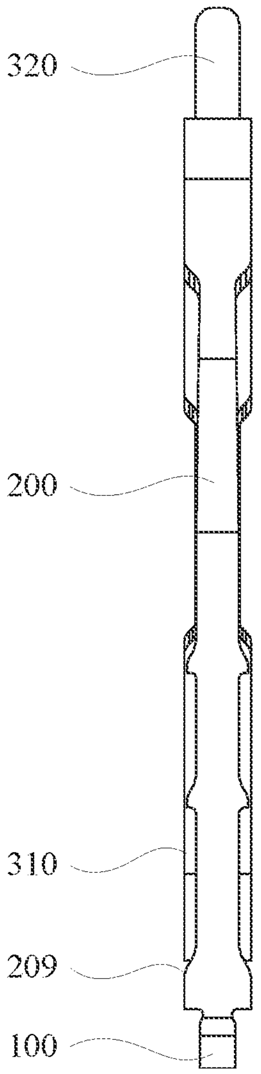
FIG. 4 is a schematic diagram of the conductor structure shown in FIG. 1 in another direction.
Figure 5:
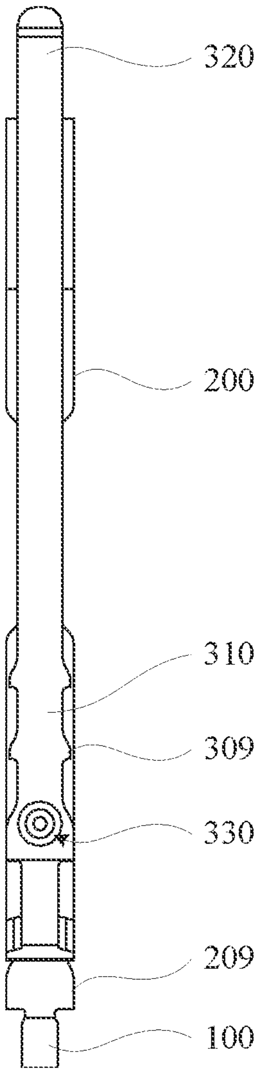
FIG. 5 is a schematic diagram of the conductor structure shown in FIG. 1 in another direction.

Referring to FIG. 4 and FIG. 5, the width of the sliding insertion portion 300 is less than or equal to the maximum width of the intermediate curved portion 200. The insertion segment 320 is arranged higher than the intermediate curved portion 200 and the back-bending structure 400. The weld leg portion 100 is arranged lower than the connection segment 310, the intermediate curved portion 200 and the curved structure 500. Widths of the first interference region 209 and the second interference region 309 are less than or equal to the maximum width of the intermediate curved portion 200.

Figure 6:
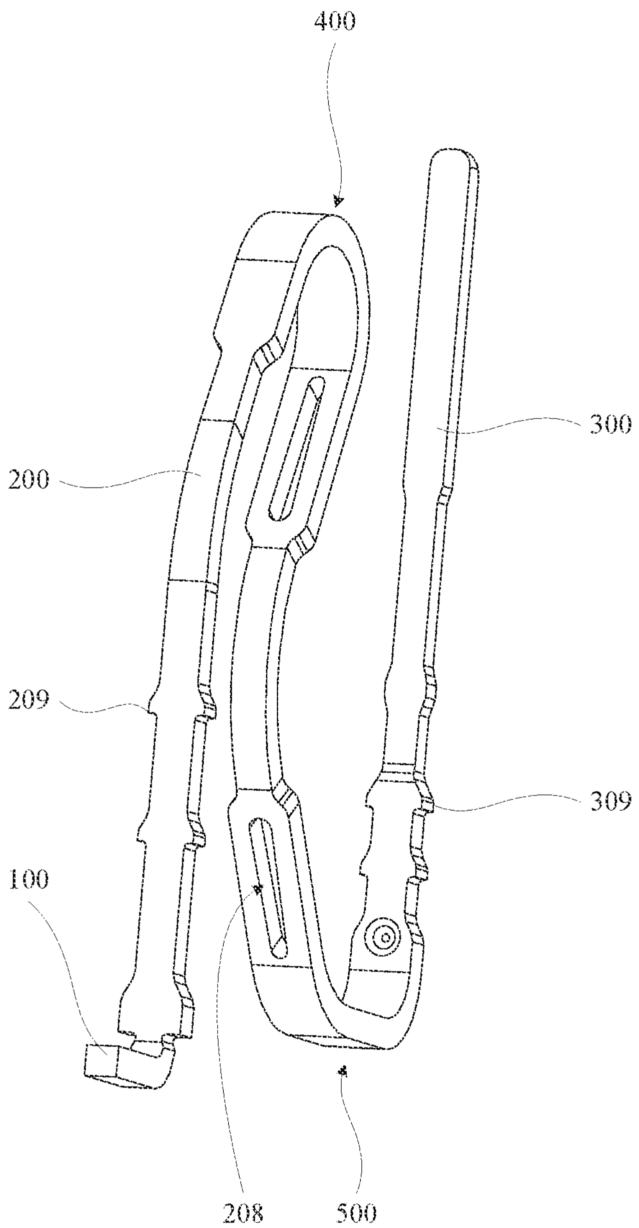
FIG. 6 is a schematic structure diagram of a conductor structure according to another embodiment of the present disclosure.
Figure 7:
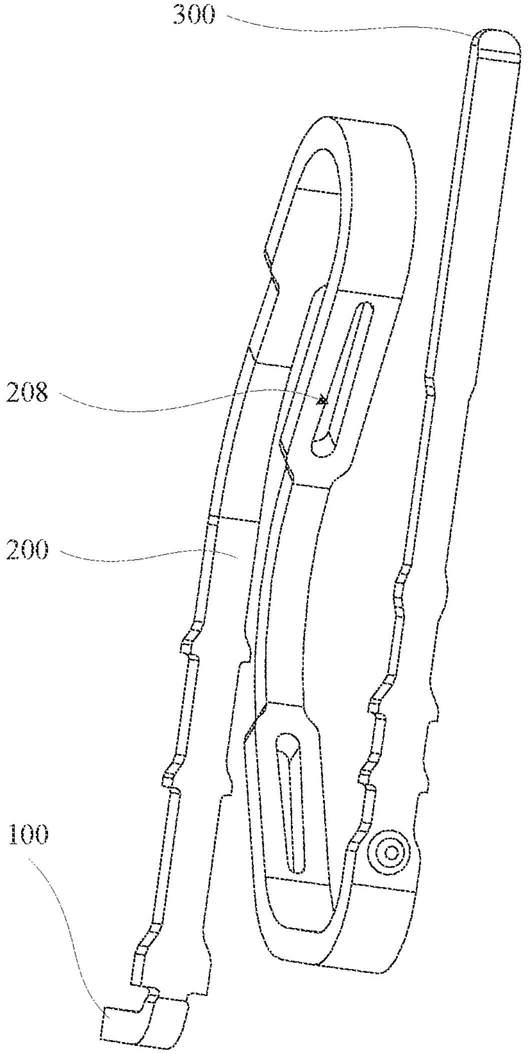
FIG. 7 is a schematic diagram of the conductor structure shown in FIG. 6 in another direction.

In an embodiment, the intermediate curved portion is provided with at least one discharge hole. Further, the shape of the discharge hole includes a partial oval shape, a partial circular shape, a partial triangular shape, and a combination thereof. The conductor structure may be provided with at least one discharge hole. In an embodiment, a conductor structure is shown in FIG. 6, which is different from the conductor structure shown in FIG. 1 in that the intermediate curved portion 200 is further provided with a discharge hole 208. There exists at least one discharge hole 208. Referring to FIG. 7, in the embodiment, there exists two discharge holes 208. It can be understood that the shape of the discharge hole is not limited to the shapes shown in FIG. 6 and FIG. 7, and it can have various shapes such as an oval shape, a rectangular shape, a circular shape, a square shape, and a triangular shape, etc. The design of the discharge hole helps to balance the stresses throughout the conductor structure when the conductor structure floats, thereby increasing the floating limit distance of the conductor structure. Further, the discharge hole is also conducive to improving the capacitance of the conductor structure itself and reducing the characteristic impedance of the conductor structure, thereby improving a high-frequency transmission performance of a connector based on the conductor structure.

Figure 8:
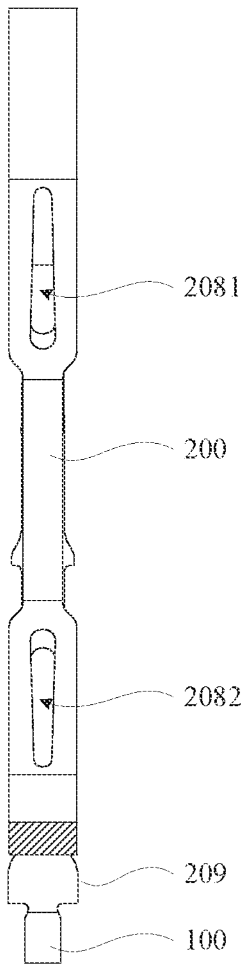
FIG. 8 is a sectional view of the conductor structure in FIG. 6 taken along a J-J direction shown in FIG. 2.

From the viewing direction of the embodiment shown in FIG. 2, the conductor structures shown in FIG. 6 and FIG. 7 have the same shape as the embodiment shown in FIG. 2 in this direction, but the difference is that a sectional view of the conductor structure shown in FIG. 6 and FIG. 7 is taken in the J-J direction shown in FIG. 2 to obtain the sectional view shown in FIG. 8. It can be seen that the conductor structure has two discharge holes, namely a first discharge hole 2081 and a second discharge hole 2082 respectively.

Figure 9:
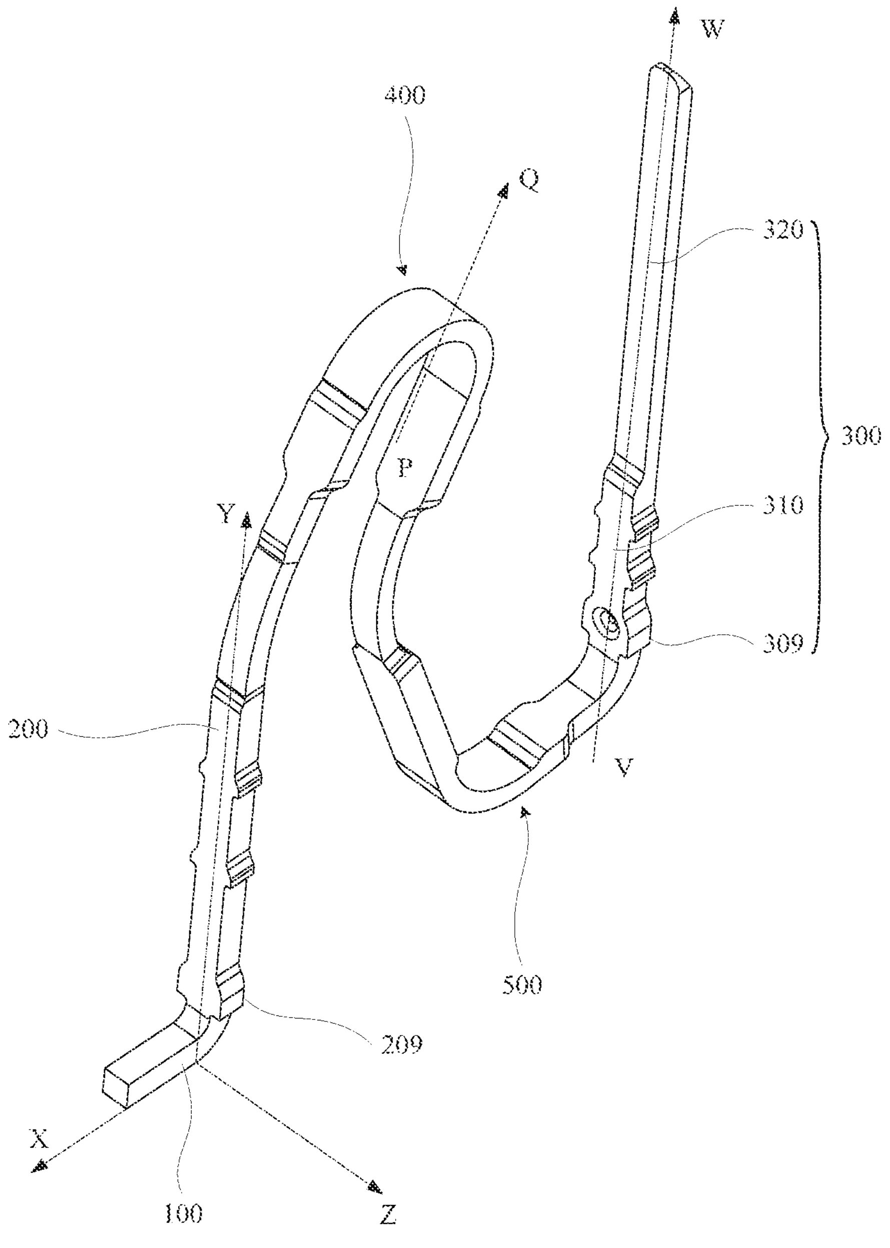
FIG. 9 is a schematic structure diagram of a conductor structure according to another embodiment of the present disclosure.

In an embodiment, a conductor structure is shown in FIG. 9, which includes a weld leg portion 100, an intermediate curved portion 200, and a sliding insertion portion 300 connected in sequence. The weld leg portion 100 is welded with a circuit board. The intermediate curved portion 200 is formed with a back-bending structure 400 and a curved structure 500 which are connected; and the sliding insertion portion 300 is configured to conduct with the plug conductor of the plug connector. In the embodiment, the weld leg portion 100, the intermediate curved portion 200, and the sliding insertion portion 300 are formed in one piece.

The intermediate curved portion 200 is provided with a first interference region 209 adjacent to the weld leg portion 100, which is configured to be in close contact with a socket lower housing body to fix the socket lower housing body. The sliding insertion portion 300 is provided with a second interference region 309 adjacent to the intermediate curved portion 200, which is configured to be in close contact with socket upper housing body to fix the socket upper housing body. The back-bending structure 400 and the curved structure 500 are configured to be floatingly exposed between the socket lower housing body and the socket upper housing body when the first interference region 209 is in close contact with the socket lower housing body and the second interference region 309 is in close contact with the socket upper housing body.

Figure 13:
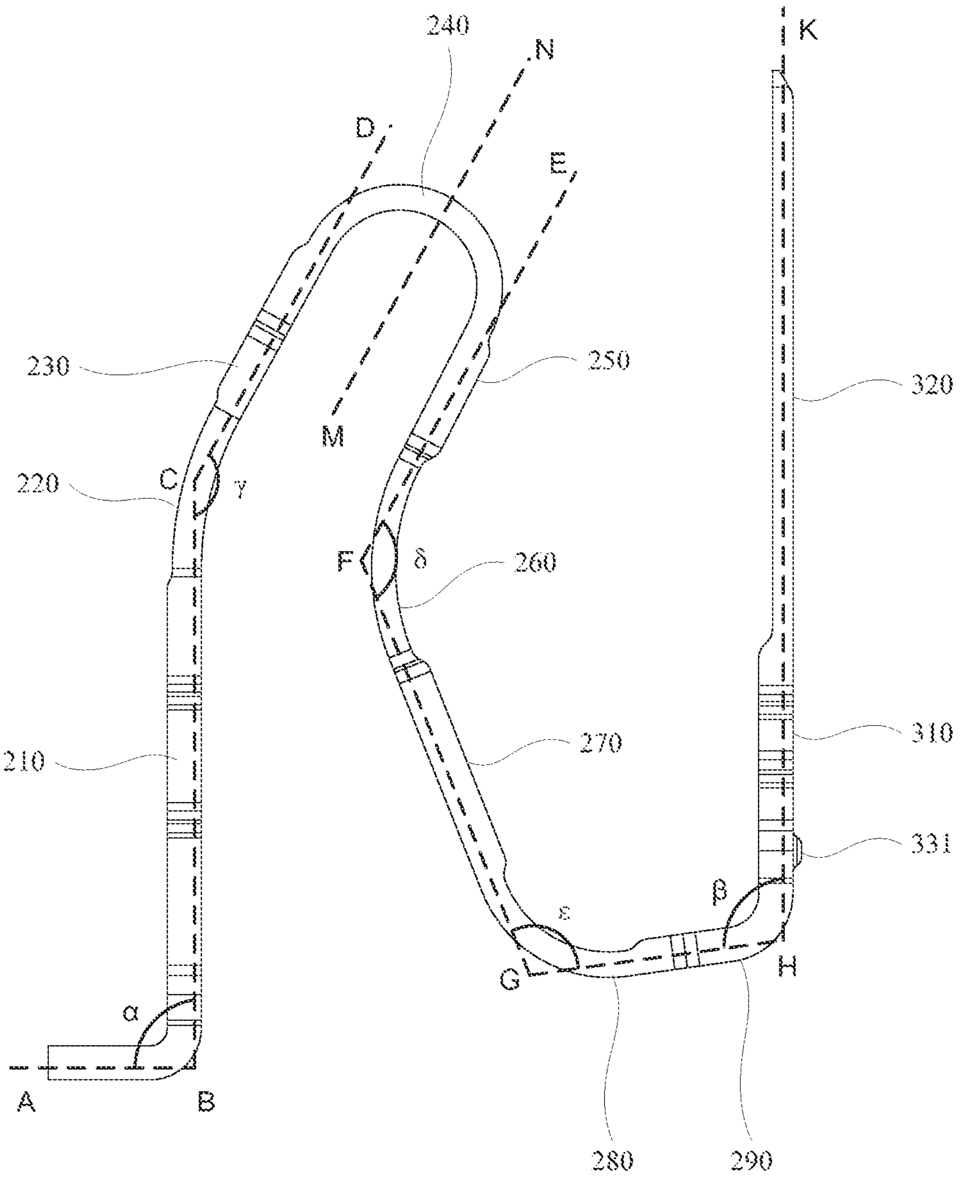
FIG. 13 is another schematic diagram of the conductor structure shown in FIG. 12.

Referring to FIG. 9, the sliding insertion portion 300 is provided with a connection segment 310 and an insertion segment 320 which are connected. The insertion segment 320 is configured to conduct with the plug conductor of the plug connector; the connection segment 310 is connected to the intermediate curved portion 200 and is adjacent to the curved structure 500; and the connection segment 310 is provided with the second interference region 309. Further, in an embodiment, the insertion segment is configured to conduct with the plug conductor of the plug connector in a plug-in mode. In the embodiment, the weld leg portion 100 extends in the X-direction (the plane where the weld leg portion 100 is located can be referred to as the plane where the X-axis is located); the first straight segment 210 of the intermediate curved portion 200 extends in the Y-direction (the plane where the first straight segment 210 is located can be referred to as the plane where the Y-axis is located); the extension direction of the weld leg portion 100 and the extension direction of the first straight segment 210 can form an XY plane. The connection position of the weld leg portion 100 and the intermediate curved portion 200 forms a right angle on the XY plane; alternatively, an acute angle or an obtuse angle may be formed in other embodiments. Referring to FIG. 9 and FIG. 13, the centerline PQ of the back-bending structure 400 is inclined to the extension direction VW of the sliding insertion portion 300. In the embodiment, the back-bending structure 400 is bent in the X-direction; and the back-bending structure 400 is further deflected or twisted in the Z-axis direction perpendicular to the XY plane. That is, in the embodiment, the back-bending structure 400 deviates from the XY plane jointly formed by the first straight segment 210 and the weld leg portion 100 and is twisted with respect to the XY plane. It can be appreciated that, when the connection position of the weld leg portion 100 and the intermediate curved portion 200 forms the right angle on the XY plane, the Y-direction is perpendicular to the X-direction, that is, a plane rectangular coordinate system is formed. In the embodiment, the back-bending structure 400 and the curved structure 500 are located in different planes.

Figure 10:
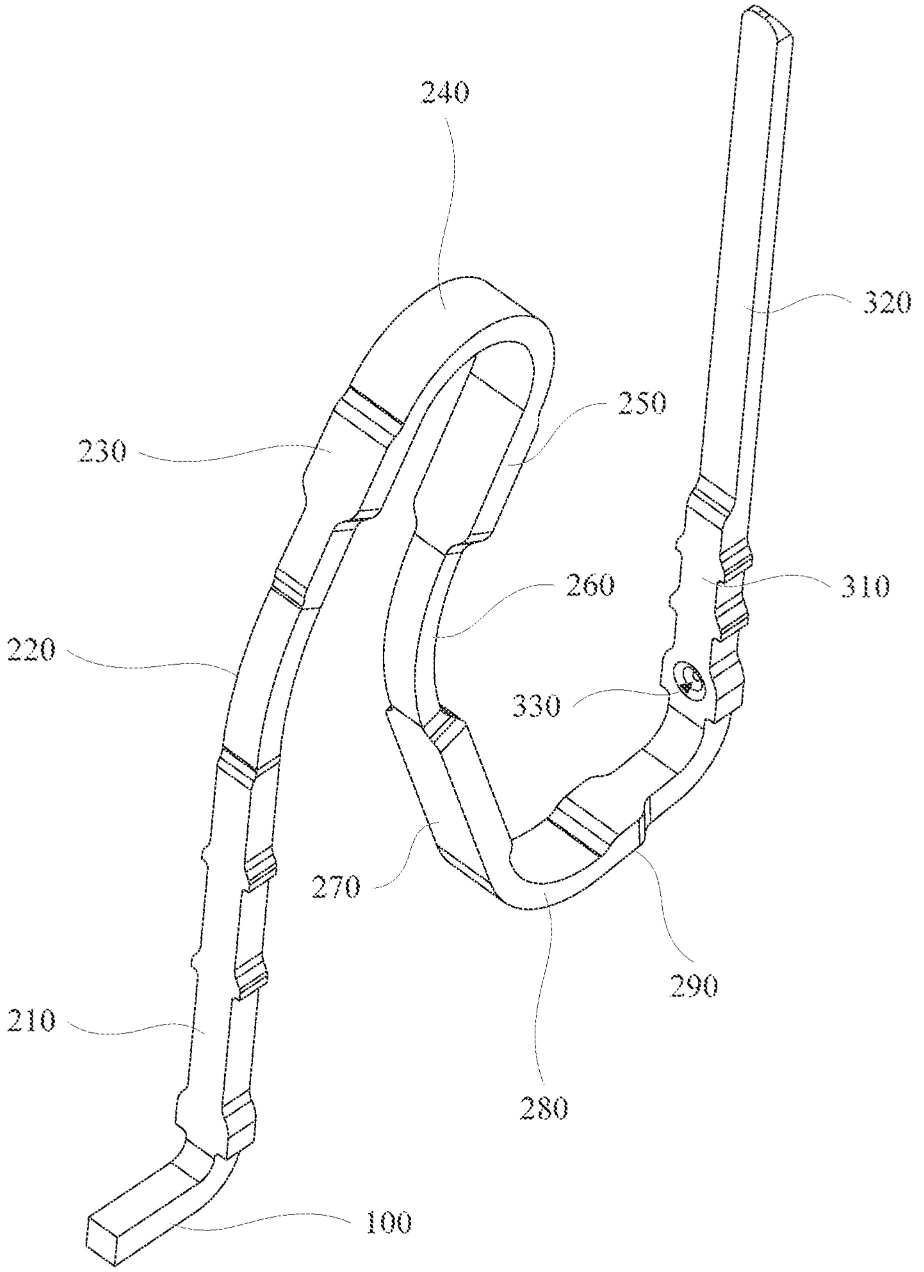
FIG. 10 is another schematic diagram of the conductor structure shown in FIG. 9.

Referring to FIG. 10, the intermediate curved portion 200 is sequentially provided with a first straight segment 210, a second curved segment 220, a third straight segment 230, a fourth curved segment 240, a fifth straight segment 250, and a sixth curved segment 260, a seventh straight segment 270, an eighth curved segment 280, and a ninth straight segment 290. The first straight segment 210 is connected to the weld leg part 100, and the first straight segment 210 is provided with the first interference region 209. The second curved segment 220, the third straight segment 230, the fourth curved segment 240, the fifth straight segment 250 and the sixth curved segment 260 jointly form the back-bending structure 400. The seventh straight segment 270, the eighth curved segment 280, and the ninth straight segment 290 jointly form the curved structure 500; the ninth straight segment 290 is connected to the sliding insertion portion 300. The connection between the first straight segment 210 and the weld leg portion 100 is bent; and the connection between the ninth straight segment 290 and the sliding insertion portion 300 is bent. The fourth curved segment 240 deviates from the XY plane or is twisted with respect to the XY plane. In the embodiment, the first straight segment 210, the second curved segment 220, the third straight segment 230, the fourth curved segment 240, the fifth straight segment 250, the sixth curved segment 260, the seventh straight segment 270, the eighth curved segment 280 and the ninth straight segment 290 are formed in one piece.

Figure 11:
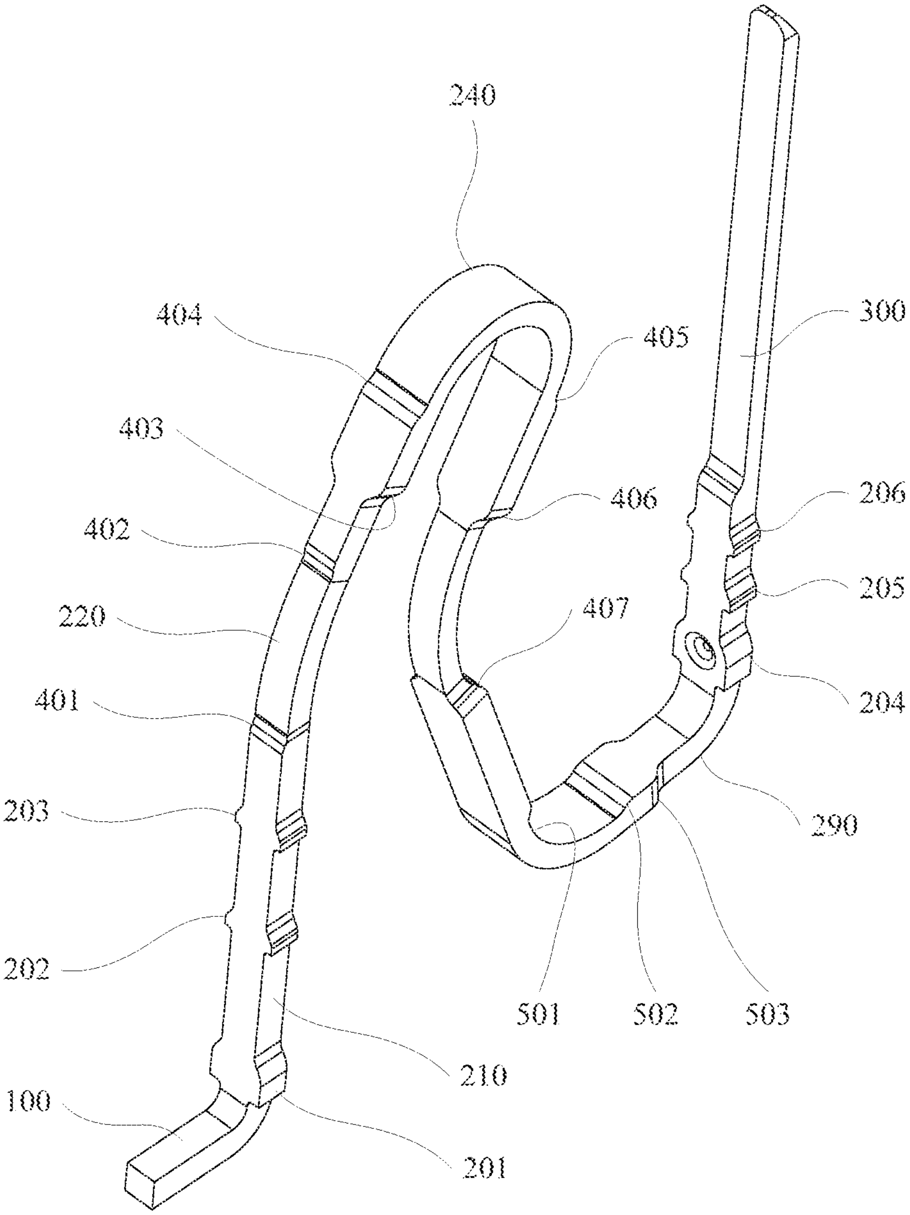
FIG. 11 is another schematic diagram of the conductor structure shown in FIG. 9.

Referring to FIG. 11, each straight segment (including the first straight segment 210, the third straight segment 230, the fifth straight segment 250, the seventh straight segment 270 and/or the ninth straight segment 290) is provided with at least one width or thickness variation adjustment portion with respect to each curved segment (including the second curved segment 220, the fourth curved segment 240, the sixth curved segment 260 and/or the eighth curved segment 280), and/or, the middle curved part 200 is provided with a shape variation region at a position where the straight segment is adjacent to curved segment. Further, in an embodiment, the shape variation region gradually changes stepwise. Furthermore, in an embodiment, at least one straight segment or at least one curved segment is further provided with the shape variation region at a middle segment thereof. Further, in an embodiment, at least one shape variation region has a difference in a stepwise direction from other shape variation regions.

Figure 14:
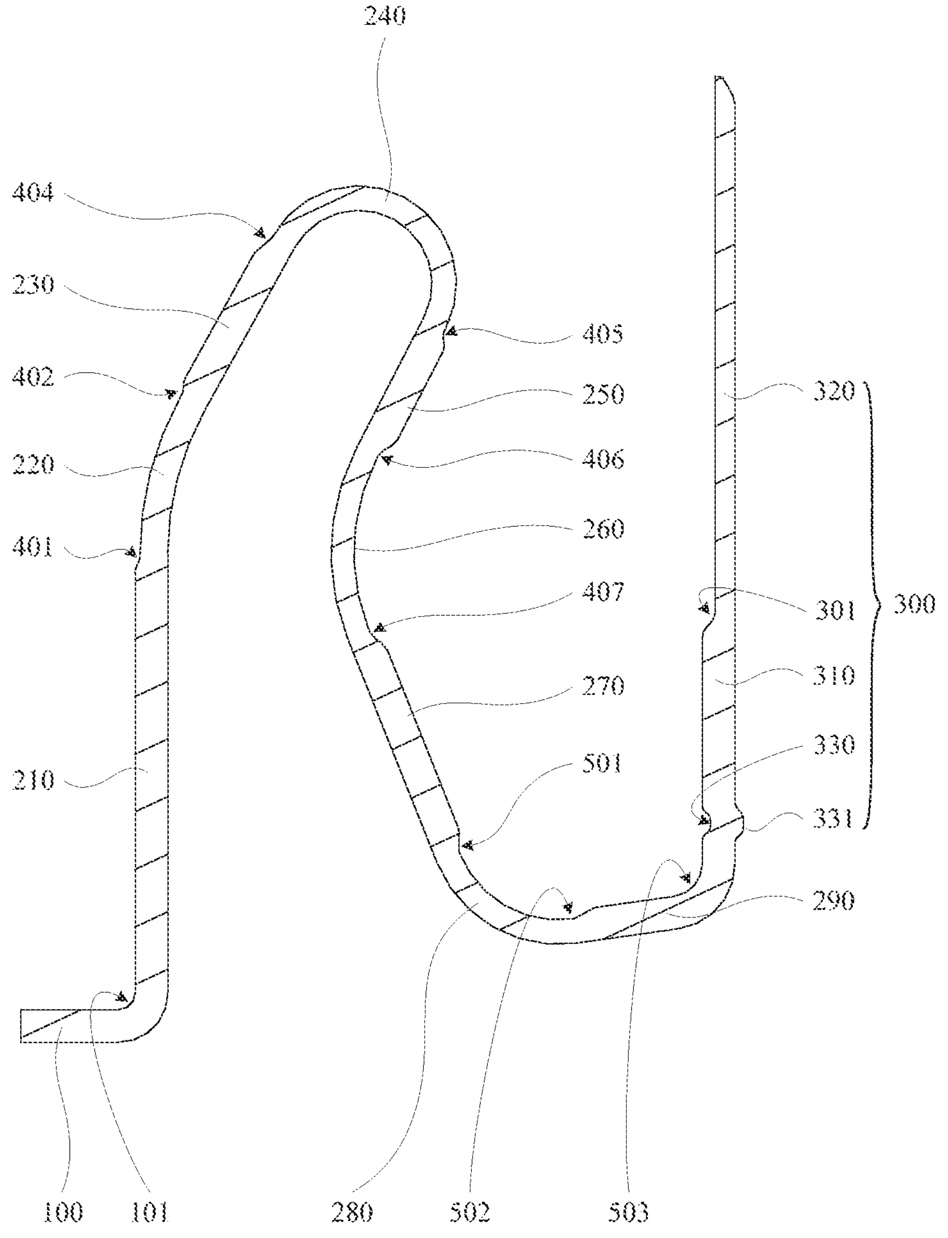
FIG. 14 is a sectional view of the conductor structure shown in FIG. 13.

Referring to FIG. 11 and FIG. 14, a first variation region 401 is provided at a position where the first straight segment 210 is adjacent to the second curved segment 220. A second variation region 402 is provided at a position where the second curved segment 220 is adjacent to the third straight segment 230; the third straight segment 230 is provided with a third variation region 403 at a middle segment thereof. A fourth variation region 404 is provided at a position where the third straight segment 230 is adjacent to the fourth curved segment 240. A fifth variation region 405 is provided at a position where the fourth curved segment 240 is adjacent to the fifth straight segment 250. A sixth variation region 406 is provided at a position where the fifth straight segment 250 is adjacent to the sixth curved segment 260. A seventh variation region 407 is provided at a position where the sixth curved segment 260 is adjacent to the seventh straight segment 270. An eighth variation region 501 is provided at a position where the seventh straight segment 270 is adjacent to the eighth curved segment 280. A ninth variation region 502 is provided at a position where the eighth curved segment 280 is adjacent to the ninth straight segment 290. The ninth straight segment 290 is provided with a tenth variation region 503 at a middle segment thereof. Further, a transition region 301 is provided at a position where the connection segment 310 is adjacent to the insertion segment 320 as a shape variation region.

Figure 12:
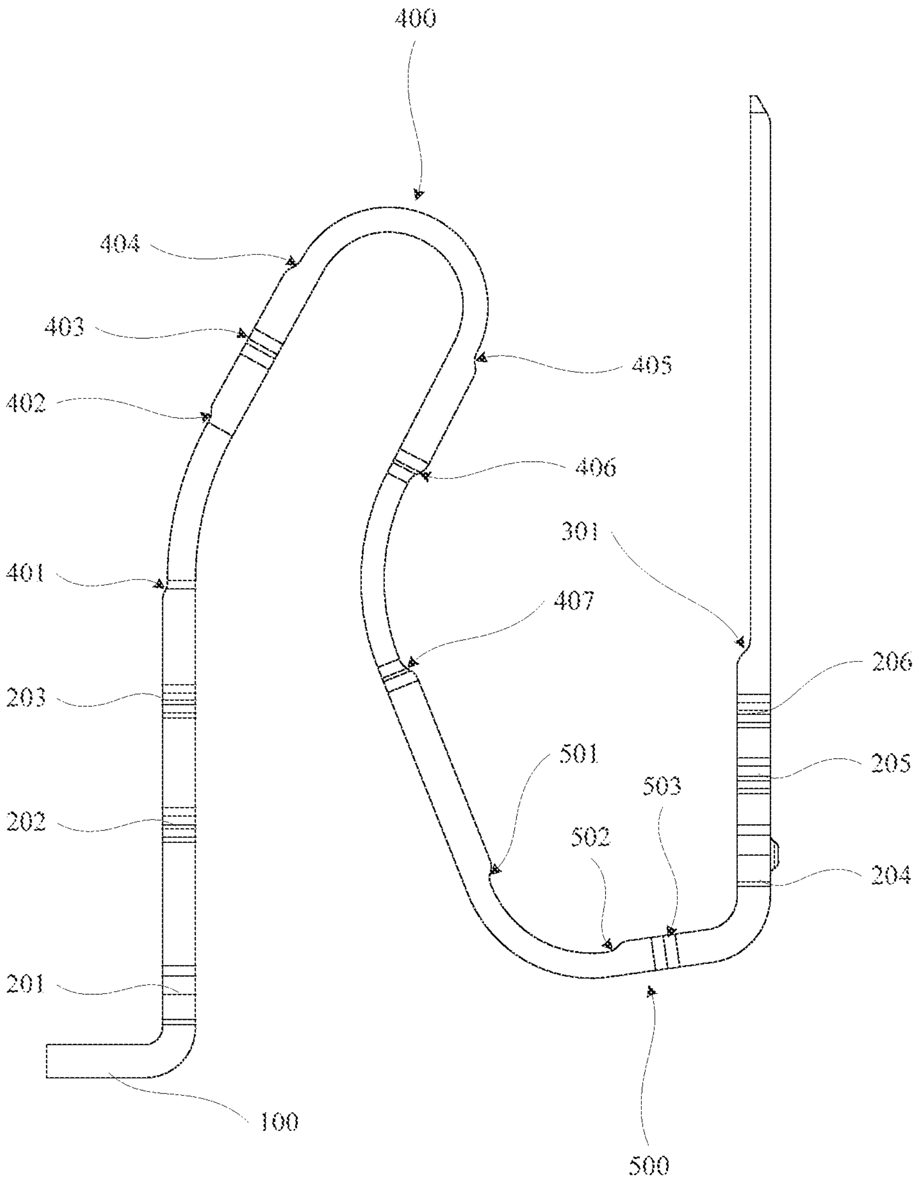
FIG. 12 is a schematic diagram of the conductor structure shown in FIG. 9 in another direction.

In each embodiment, the interference region includes the first interference region and the second interference region. Each interference region has at least two interference portions; and the interference portions are protruded from the intermediate curved portion or the sliding insertion portion; that is, at least two interference portions of the first interference region are protruded from the intermediate curved portion; at least two interference portions of the second interference region are protruded from the sliding insertion portion. Referring to FIG. 11 and FIG. 12, in the embodiment, the first straight segment 210 is provided with the first interference region 209; and the first interference region 209 includes a first interference portion 201, a second interference portion 202 and a third interference portion 203. The connection segment 310 is provided with the second interference region 309; and the second interference region 309 includes the fourth interference portion 204, the fifth interference portion 205 and the sixth interference portion 206. Through such design, the socket lower housing body of the socket connector is fixed onto the conductor structure through a plurality of interference portions in the first interference region, and the socket upper housing body is fixed onto the conductor structure through a plurality of interference portions in the second interference region, which is beneficial to connect the socket connector to the plug connector only through a part of the intermediate curved portion of the conductor structure, so that through the double vibration damping effects of the back-bending structure and the curved structure, the vibration energy is better released, the transmission of the vibration force between the socket connector and the plug connector is reduced, and the reliability of the board-to-board floating connection is ensured.

As shown in FIG. 13, the extension direction BC of the first straight segment 210 is parallel to the extension direction HK of the sliding insertion portion 300; the extension direction BC of the first straight segment 210 is parallel to the extension direction of the weld leg portion 100. A first included angle $\alpha$ is formed between the extension direction BC of the first straight segment 210 and the extension direction AB of the weld leg portion 100; a second included angle $\beta$ is formed between the extension direction GH of the ninth straight segment 290 and the extension direction HK of the sliding insertion portion 300; a third included angle $\gamma$ is formed between the extension direction BC of the first straight segment 210 and the extension direction CD of the third straight segment 230 at the second curved segment 220; a fourth included angle δ is formed between the extension direction EF of the fifth straight segment 250 and the extension direction FG of the seventh straight segment 270 at the sixth curved segment 260; a fifth included angle ε is formed between the extension direction FG of the seventh straight segment 270 and the extension direction GH of the ninth straight segment 290 at the eighth curved segment 280. Further, the first included angle α is greater than or equal to 90 degrees, the second included angle β is greater than or equal to 90 degrees, the third included angle γ is greater than 90 degrees, and the fourth included angle δ is greater than or equal to 90 degrees, and/or, the fifth included angle ε is greater than or equal to 90 degrees. In the embodiment, the first included angle α is equal to 90 degrees, the second included angle β is greater than or equal to 90 degrees, the third included angle γ is greater than 90 degrees, and the fourth included angle δ is greater than 90 degrees, the fifth included angle ε is greater than 90 degrees. In the embodiment, the intermediate curved portion 200 has a shape similar to an "R", which may also be referred to as an R shape, and may also be regarded as a R-shaped stretching deformation. Referring to FIG. 9, in the embodiment, the fourth curved segment 240 has a symmetrical structure and a centerline MN thereof intersects the XY plane. Further, the design that the first included angle α through the fifth included angle ε are right angles or obtuse angles is conducive to reducing the impact on the strength and stress of the connector material itself on the premise of properly releasing the vibration energy, ensure the service life of the product, and ensure the high-speed transmission effect of large amounts of data.

Referring to FIG. 10, FIG. 13 and FIG. 14, the weld leg portion 100 is provided with a bending region 101 adjacent to the first straight segment 210 of the intermediate curved portion 200, which can also be regarded as that the bending region 101 is provided at a position where the first straight segment 210 is adjacent to the weld leg portion 100. The connection segment 310 is provided with a positioning hole 330 and a corresponding positioning convex portion 331. Both the positioning hole 330 and the positioning convex portion 331 are configured to fit in contact with the plug conductor of the plug connector. On the one hand, such design is beneficial to enhance the effective connection and conduction between the conductor structure and the plug conductor; on the other hand, such design is beneficial to prevent the plug conductor from being out of contact with the conductor structure, thereby further improving the applicability in the high-vibration environment, even if the center position is offset within the preset range during the board-to-board connection, it can still effectively ensure the effective connection and conduction between the conductor structure and the plug conductor.

Since the conductor structure described in each embodiment of the present disclosure is required to implement a stable transmission of large amounts of data in the high-vibration environment, the impact of the size of the conductor structure on the characteristic impedance will be described below in conjunction with the signal analysis.

Specifically, in the floating board-to-board connection involving the connection between the plug connector and the socket connector in the vibration environment, a relationship between capacitance parameters and a capacitance of a parallel plate can be expressed as:

$$C = \varepsilon_0 \frac{A}{h}; \quad (1)$$

where C denotes the capacitance, with a unit of pF; $\varepsilon_0$ denotes a dielectric constant of a medium, with a unit of pF/cm; A denotes an area of the parallel plate, with a unit of square centimeter; h denotes a distance between parallel plates, with a unit of centimeter. The above relationship (1) shows that: the larger the distance between the conductors, the smaller the capacitance; the larger an overlapping area of the conductors, the larger the capacitance.

The characteristic impedance of a lossless transmission line can be expressed by an inductance per unit length (L) and a capacitance per unit length (C), that is, a formula for calculating the characteristic impedance of an ideal transmission line can be expressed as:

$$Z_0 = \sqrt{\frac{L}{C}}; \quad (2)$$

according to the calculation formula (2) of the characteristic impedance of the ideal transmission line, any factor that affects the capacitance per unit length and inductance per unit length of the transmission line may affect the characteristic impedance of the transmission line. Factors that affect the characteristic impedance of transmission lines include: a differential microstrip line width, a dielectric thickness, a dielectric constant, and a differential microstrip line thickness. The differential microstrip line is the conductor structure described in each embodiment.

The impact of the thickness of the conductor on the characteristic impedance of the transmission line will continue to be illustrated below. When the thickness of the conductor of the transmission line decreases, the distance between the two conductor structures increases. According to the plate capacitance relationship (1), the distance between the parallel plates increases and the capacitance decreases. According to the calculation formula (2) of the characteristic impedance of the transmission line, the capacitance decreases and the characteristic impedance of the transmission line increases. In the test, when the thickness of the conductor structure is reduced from 0.2 mm to 0.15 mm, the thickness of the medium under the conductor structure is increased from 0.2 mm to 0.25 mm, and the characteristic impedance becomes larger by about 10Ω.

Variations in the size of the conductor structure may affect the inductance per unit length (L), and then affects the characteristic impedance. A self-inductance calculation formula of a conductor structure with a rectangular cross-section can be approximately expressed as:

$$L = \frac{\mu_0}{2\pi} l \left[ \ln\left(\frac{2l}{w+t}\right) + \frac{1}{2} + \frac{2}{9}\left(\frac{w+t}{l}\right) \right]; \quad (3)$$

where $\mu_0$ denotes a magnetic permeability; l denotes a length of the microstrip line; w denotes a width of the microstrip line, and t denotes the thickness of the microstrip line. According to the calculation formula (3), when l is much larger than w+t, the magnitude of the inductance L is mainly determined by $$\left(\frac{2l}{w+t}\right),$$

the larger the line width, the smaller the inductance.

The reflection of the signal is closely related to the impedance of the interconnection line. As long as there exists an impedance discontinuity point in the interconnection line, the impedance of the region 1 is denoted as $Z_1$, and the impedance of the region 2 is denoted as $Z_2$. The signal may be reflected at a position where the region 1 it adjacent to the region 2. A relationship between the reflection coefficient Γ and the discontinuous impedance is as follows:

$$\Gamma = \frac{V_{reflect}}{V_{inc}} = \frac{Z_2 - Z_1}{Z_2 + Z_1}; \tag{4}$$

where $V_{inc}$ is an incident voltage, $V_{reflect}$ is a reflected voltage, and a sum of the two is equal to a transmission voltage.

In each embodiment, the sliding insertion portion of the conductor structure conducts with the plug conductor of the plug connector, and the signal has a reflection coefficient at the conduction position. As above-mentioned, the variation of the thickness may affect the inductance per unit length. The larger the thickness, the more dispersed the current, and the smaller the inductance. The smaller the thickness, the more concentrated the current, and the larger the inductance. The variation of the thickness may affect the capacitance per unit length; the larger the thickness, the larger the capacitance; and the smaller the thickness, the smaller the capacitance. Therefore, when other factors remain unchanged, the smaller the thickness, the larger the inductance per unit length, the smaller the capacitance per unit length, and thus the larger the characteristic impedance.

Figure 15:
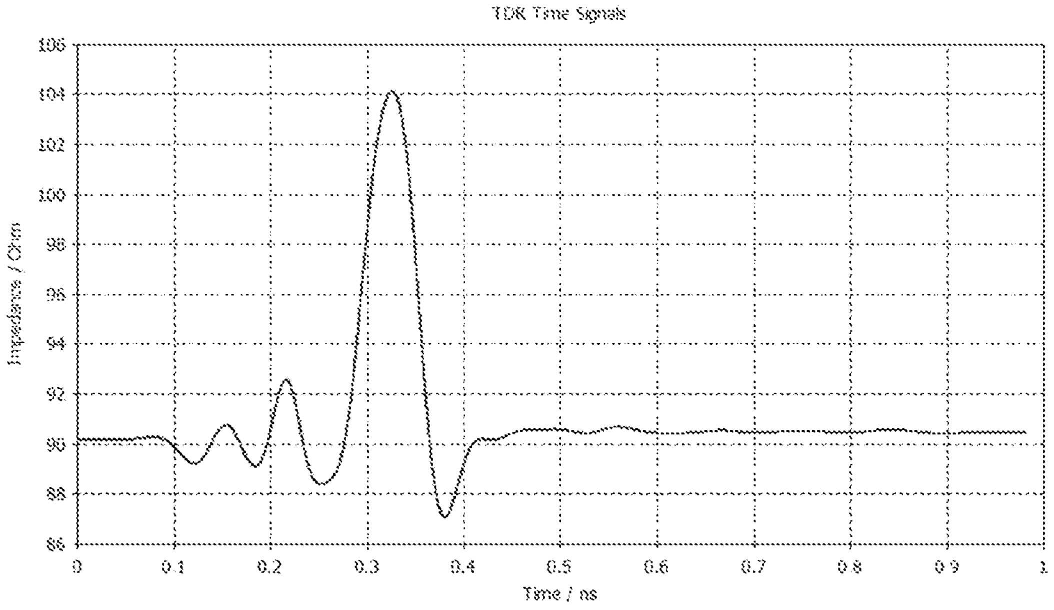
FIG. 15 is a schematic diagram of a time domain reflection test of the conductor structure shown in FIG. 1.
Figure 16:
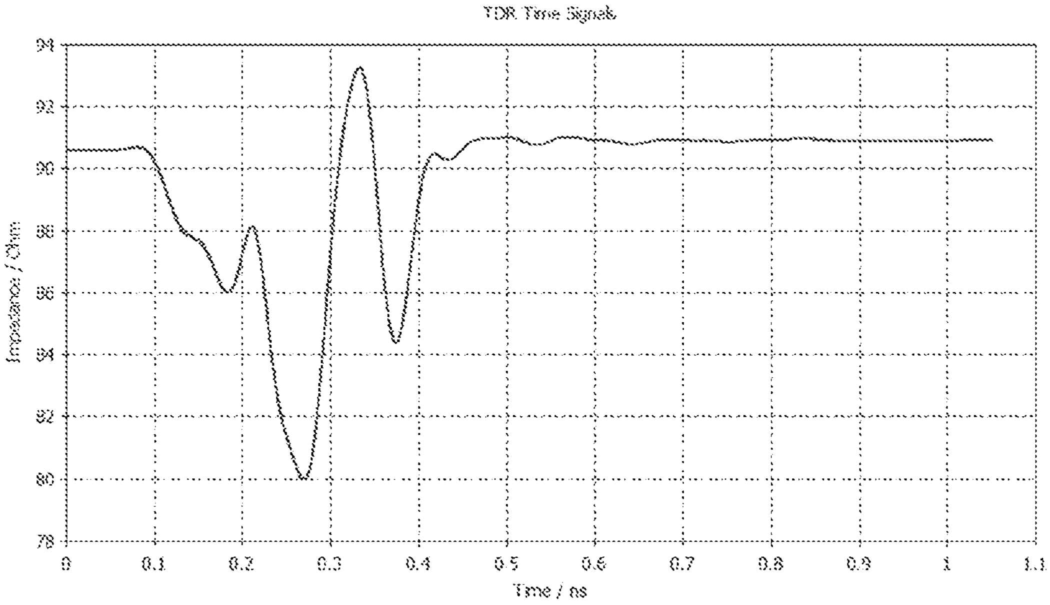
FIG. 16 is a schematic diagram of a time domain reflection test of the conductor structure shown in FIG. 14.

By using the conductor structure as shown in FIG. 1, the thickness is constant, a Time Domain Reflectometry (TDR) test is performed, and a result is shown in FIG. 15. By using another conductor structure provided with a first variation region 401, a second variation region 402, a third variation region 403, a fourth variation region 404, a fifth variation region 405, a sixth variation region 406, a seventh variation region 407, an eighth variation region 501, a ninth variation region 502, and a tenth variation region 503, as shown in FIG. 14; the TDR test is performed on the conductor structure, and the result is shown in FIG. 16. Comparing FIG. 15 to FIG. 16, it shows the variation of the characteristic impedance during the variation of the thickness from thin to thick, which is completely consistent with the conclusion obtained by the analysis. After the thickness of the conductor structure increases, the characteristic impedance becomes smaller. A peak value of the regulated impedance drops from 104 to about 93, which shows that the conductor structure shown in FIG. 14 has the advantage of reducing the peak value of the characteristic impedance.

Figure 17:
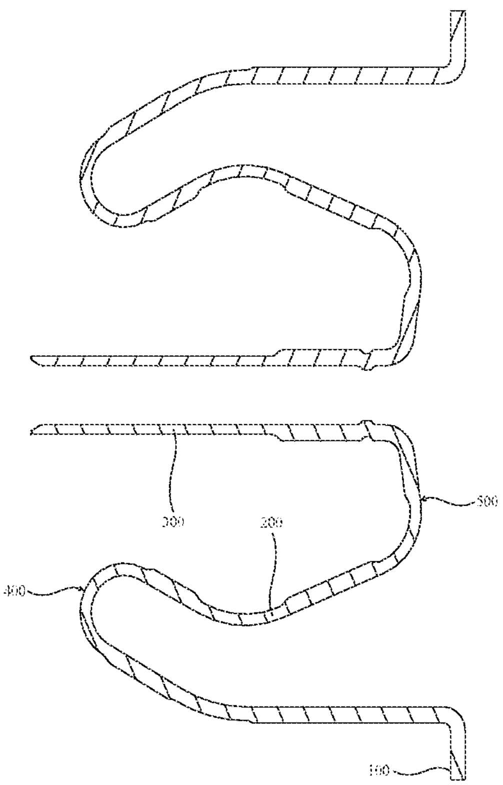
FIG. 17 is a schematic diagram of an arrangement of the conductor structure shown in FIG. 14 when applied to an electrical connection module of the present disclosure.

In an embodiment, an electrical connection module includes a socket connector; the socket connector has a socket lower housing body, a socket upper housing body, and the conductor structure described in any of the above-mentioned embodiments. In an embodiment, the electrical connection module further includes a plug connector matching the socket connector. That is, the electrical connection module can be manufactured separately as a socket connector and used in combination with the plug connector; alternatively, the electrical connection module can be manufactured as a complete electrical connector including the socket connector and the plug connector. In an embodiment, the conductor structures in the electrical connection module are used in pairs, as shown in FIG. 17. In practical applications, the electrical connection module is provided with a plurality of pairs of the conductor structures, and the plurality of pairs of the conductor structures are arranged in two rows. In an embodiment, the electrical connection module serves as a socket for the floating electrical connection.

Figure 18:
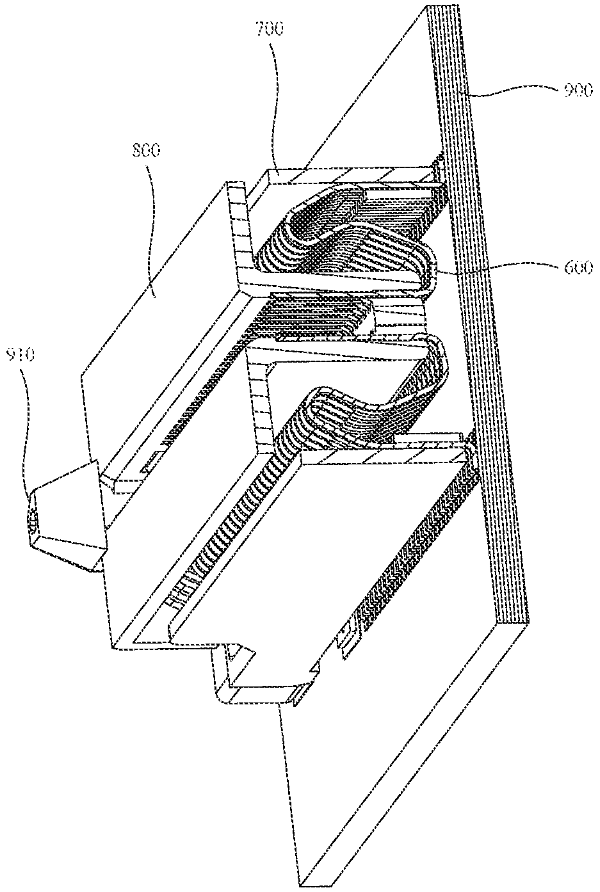
FIG. 18 is a schematic structure diagram of an electrical connection module according to an embodiment of the present disclosure.

In an embodiment, in the electrical connection module as shown in FIG. 18, a plurality of the conductor structures 600 are regularly arranged in two groups, and a first interference region of each conductor structure 600 in each group is configured to be in close contact with a socket lower housing body 700 to integrally fit and fix the socket lower housing body 700. A second interference region of each conductor structure 600 in each group is configured to be in close contact with the socket upper housing body 800 to integrally fit and fix the socket upper housing body 800. In the state where the conductor structure 600 is connected to the socket lower housing body 700 and the socket upper housing body 800, that is, the first interference region of the conductor structure 600 is in close contact with the socket lower housing body 700 and the second interference region is in close contact with the socket upper housing bod 800, the back-bending structure and curved structure are floatingly exposed between the socket lower housing body 700 and the socket upper housing body 800, to form a floating vibration damping structure, which is adapted to the high-vibration environments. Since the material of the conductor structure itself has the capability to deform, even if the center position is offset within a preset range during the board-to-board connection, the effective connection and conduction between the conductor structure and the plug conductor can still be effectively ensured.

Further, in this embodiment, the electrical connection module further includes a circuit board 900, the weld leg portion of each conductor structure 600 is welded and fixed on the circuit board 900. With such a design, the socket upper housing body 800 is only connected to the socket lower housing body 700 through a plurality of conductor structures 600, and the socket upper housing body 800 is floating with respect to the socket lower housing body 700. The vibration damping effect of the back-bending structure and the curved structure is beneficial to greatly attenuate the vibration energy transmitted by the plug connector connected to the socket upper housing body 800, accordingly the vibration is difficult to damage the socket upper housing body 800 and/or the circuit board 900, and then is difficult to affect the effective welding between the weld leg portion and the circuit board. Further, in the embodiment, the electrical connection module is further provided with an installation reinforcement buckle 910 on the circuit board 900. One end of the installation reinforcement buckle 910 is fixed onto the circuit board 900, for example, fixed on the circuit board 900 by screwing, and the other end extends above the socket upper housing body 800 to limit a displacement region of the socket upper housing body 800. That is to say, during the vibration, for example, when the socket upper housing body 800 is vibrated under the action of the plug connector, the maximum displacement of the socket upper housing body 800 can be limited by the installation reinforcement buckle 910, which can avoid the impact on effective welding between the weld leg portion and the circuit board due to an excessive vibration intensity, accordingly it is beneficial to protect the signal transmission between the conductor structure and the circuit board.

The specific structure of the socket connector will be described below by taking the conductor structure as the signal conductor of the socket connector (that is, the socket signal conductor or the socket signal conductor structure). It should be noted that, the electrical connection module may also include structures such as a socket grounding conductor, a socket power conductor, and a socket upper housing body, etc., according to the function definition.

In an embodiment of the specific applications, an electrical connector consists of a plug connector and a socket connector which are vertically mated. The plug connector has conductors regularly arranged at intervals, which can also be referred to as plug conductor; and the conductor includes a plug signal conductor and a plug power conductor. One end of the conductor is connected to the circuit board (that is, a plug mounting circuit board) by welding, and the other end has an elastic deformation portion in contact with the socket connector. The conductors are arranged side by side in two rows. There is a misalignment in the Z-direction between the two rows of conductors, and the misalignment has at least one PIN distance. Each row of conductors is arranged according to a signal arrangement mode of ground-signal-signal-ground, and then the plug ground conductor is utilized to conduct all grounded plug signal conductors and all grounded plug power conductors in the plug connector once at least, as for both ends of the housing, each end is equipped with a weld reinforcement leg configured to enhance the welding strength of the electrical connector on the circuit board, that is, a plug weld reinforcement leg. In each row of the plug signal conductors of the plug conductors, the distance between the plug signal conductors is a fixed value, called 1 PIN. However, the distance between the plug power conductor and the plug signal conductor or between the plug power conductors is adjusted according to a circulation capacity of the connector and a requirement of a male socket voltage, and is the same as or different from the distance between the plug signal conductors.

The socket connector has a socket conductor stamped in an R shape. The socket conductor includes a socket signal conductor and a socket power conductor; or the socket signal conductor and the socket power conductor welded and fixed on the circuit board (such as a socket mounting circuit board) are referred to as socket conductors. The socket conductor has a weld leg portion for welding with the circuit board, an R-shaped intermediate curved portion, and a sliding insertion portion for conduction with the conductor of the plug connector. The socket conductors are arranged in columns at distance, and are arranged in two columns or two rows. During the arrangement, the R-shaped intermediate curved portions of the two rows of socket conductors are curved toward the center portion of the electrical connector. During the arrangement, the R-shaped intermediate curved portions of the two rows of socket conductors are curved to approach the plane where the X-axis of the socket connector is located. The weld leg of the socket conductor is welded and fixed on the circuit board. Because the socket conductor is assembled on the socket lower housing body, and is fixed adjacent to the weld leg portion of the socket conductor, the socket lower housing body is fixed on the circuit board together with the weld leg portion of the socket conductor. Meanwhile, the sliding insertion portion of the socket conductor is assembled with the socket upper housing body, and the socket upper housing body is connected with the weld leg portion of the socket conductor through the R-shaped curved portion. Since the material of the conductor itself has the capability to deform, when the plug connector is inserted into the socket connector, even if the center positions of the two connectors are offset within a limited value range, the plug housing body may forcibly guide the centerline of the socket upper housing body to substantially coincide with the centerline of the plug housing body under the mutual guiding actions of a guide groove of the plug housing body and a guidepost of the socket upper housing body; at this moment, the R-shaped curved portion is deformed, accordingly a reliable electrical connection between the two connectors can be implemented in a circumference range with the centerline of the upper housing body as the origin. The linear deformation of the R-shaped curved portion can reduce the stresses caused by the installation deviations to the plug conductor, the position where the weld leg of the plug is welded to the circuit board, and the position where the weld leg of the socket is welded to the circuit board. There is also a misalignment in the Z-direction between the two rows of socket conductors, and the misalignment has at least one PIN distance. It can be understood that, in order to implement the electrical connection, there is a one-to-one correspondence between the structure of each of the plug signal conductors and the structure of each of the socket signal conductors. After the sliding insertion portion of the socket conductor extends down to approach the straight segment at a first bending position, each row of conductors is arranged according to the signal arrangement mode of "ground-signal-signal-ground-signal-signal-ground", and then one socket grounded conductor is utilized to conduct all the grounded conductors in the socket connector. When the socket conductors are arranged, the R-shaped intermediate curved portions of the two rows of socket conductors is curved toward the center portion of the electrical connector. When the socket conductors are arranged, the R-shaped intermediate curved portions of the two rows of socket conductors are curved to approach the plane where the X-axis of the socket connector is located. At both ends of the plug housing body, each end is respectively equipped with a weld reinforcement leg for enhancing the welding strength of the electrical connector on the circuit board, that is, the socket weld reinforcement leg.

In the portion of the socket conductor from the weld leg portion welded with the circuit board to the elastic deformation portion in contact with the socket connector, there exists at least one clamping point assembled with the socket lower housing body, that is, an installation interference position, which includes a socket signal installation interference position and a socket power installation interference position. There exists at least one adjustment portion, i.e., a variation adjustment portion, of the width or thickness of the conductor in the non-clamping point portion assembled inside the insulating socket housing body. The socket connector has a socket conductor stamped according to an R shape, and further has a socket lower housing body, a socket upper housing body, and weld reinforcement legs at both ends in the length direction. The socket conductor has a weld leg portion welded with the circuit board, an R-shaped intermediate curved portion, and a sliding insertion portion configured to conduct with the plug conductor of the plug connector. The weld leg portion of the socket conductor for welding with the circuit board is completely fixed on the circuit board under the welding action. The socket conductor extends vertically upward along the right side of the weld leg portion to form a straight segment with at least one clamping point. In the straight segment, there exists at least one variation in the width or thickness direction. The straight segment is configured to assemble with the socket lower housing body, so that the socket lower housing body is fixed above and adjacent to the weld leg portion of the socket. The socket conductor continues to extend upward at the straight segment, and is bent obliquely to the plane where the X-axis of the socket connector is located when the socket conductor extends beyond a dedicated portion where the socket lower housing body interferes with the clamping point of the socket conductor; and a bending angle is an obtuse angle. The socket conductor continues to extend to form the R-shaped curved portion. Specifically, firstly, the socket conductor is stamped and bent to form a back-bending structure, and a centerline of the back-bending portion is inclined to the plane where the X-axis of the socket connector is located; and then, the back-bending structure, after extending to a certain length, is bent again to approach the plane where the X-axis of the socket connector is located. The socket conductor at the bending position continues to extend below and adjacent to the socket upper housing body, and is bent again to approach the plane where the X-axis of the socket connector is located to extend adjacent to the socket upper housing body, until extending directly below the conductor installation hole of the socket upper housing body, the socket conductor is curved vertically upwards, thereby forming a curved structure as a whole with respect to the back-bending structure. The socket conductor curved vertically upward continues to extend upward, and at least one clamping point for assembling interference with the socket upper housing body is provided in the extended portion. When continuing to extend upward beyond the interference region of the clamping point of the socket upper housing body, the socket conductor extends to form a sliding insertion region that is docked with the plug conductor. In an embodiment, in the whole region on the socket conductor from the weld leg portion welded with the circuit board to the sliding insertion portion docked with the plug conductor, there exists at least one region where the width and thickness of the socket conductor vary.

In an embodiment, the socket conductors are arranged in two rows at intervals, and when arranged, the R-shaped intermediate curved portions of the two rows of socket conductors are curved toward the center portion of the electrical connector. When arranged, the R-shaped intermediate curved portions of the two rows of socket conductors are curved to approach the plane where the X-axis of the socket connector is located. There exists a misalignment in the Z-direction between the two rows of conductors, and the misalignment has at least one PIN distance. Each row of conductors is arranged according to the signal arrangement mode of ground-signal-signal-ground. Under the socket upper housing body, the socket grounded conductor is utilized to conduct all grounded conductors in each socket signal conductor and all grounded conductors in each socket power conductor in the socket connector once at least. The weld leg portion of the socket conductor is welded and fixed on the circuit board. Since the socket conductor is assembled on the socket lower housing body, and is fixed adjacent to the weld leg portion of the socket conductor, the socket lower housing body is fixed on the circuit board together with the weld leg portion of the socket conductor. Meanwhile, the sliding insertion portion of the socket conductor is assembled with the socket upper housing body; the socket upper housing body is connected to the weld leg portion of the socket conductor through the R-shaped curved portion. At the moment, the R-shaped curved portion (i.e., the intermediate curved portion) floats in an inner space enclosed by the socket upper housing body and the socket lower housing body. Since the material of the conductor (such as copper) itself has the capability to deform, when the plug connector is inserted into the socket connector, even if the center positions of the plug connector and the socket connector are offset within a limited value range, the plug housing body may forcibly guide the centerline of the socket upper housing body to substantially coincide with the centerline of the plug housing body under the mutual guiding actions of a guide groove of the plug housing body and a guidepost of the socket upper housing body. At this moment, the R-shaped curved portion (i.e., the intermediate curved portion) is deformed, accordingly a reliable electrical connection between the plug connector and the socket connector can be implemented in a circumference range with the centerline of the upper housing body as the origin. The linear deformation of the R-shaped curved portion can reduce the stresses caused by the installation deviations to the plug conductor, the position where the weld leg of the plug is welded to the circuit board, and the position where the weld leg of the socket is welded to the circuit board, thereby implementing the effective and reliable electrical connection. Moreover, in each embodiment, there exists a structure limit between the socket upper housing body and the socket lower housing body, to prevent a range of the connection deviation between the socket connector and the plug connector from exceeding a set value. Through a gap between the socket upper housing body and the socket lower housing body, when the socket upper housing body moves with the guidance of the plug housing, the socket upper housing body may be in contact with the socket lower housing body when moving to a certain extent, and may be blocked by the socket lower housing body, thereby preventing an irreversible deformation caused by exceeding a yield strength of the material of the socket conductor, or a damage to the connector.

In each of the above embodiments, the electrical connection module may serve as part or all of the socket connector, or as the electrical connector. In an embodiment, a vehicle-mounted electronic device includes the electrical connection module described in any of the above-mentioned embodiments. The vehicle-mounted electronic device is applied in the fields of electric vehicle electronic control integration and autonomous driving module integration. In an embodiment, the vehicle-mounted electronic device includes a navigator, a sound player, a video player, an air conditioner, a monitoring device, and so on. In an embodiment, the electrical connection module is applied at a floating board-to-board connection of the vehicle-mounted electronic device. The electrical connection module can also be applied to electric control devices, vehicles, LED screens and industrial machines. In an embodiment, an electronic control device, for example, having an electronic mother board and an expansion daughter board which are interconnected, includes the electrical connection module described in any of the above-mentioned embodiments. In an embodiment, a vehicle, such as an electric vehicle or an autonomous vehicle, includes the electrical connection module described in any of the above-mentioned embodiments. In an embodiment, an LED screen, such as an LED display screen with a display area exceeding four square meters, includes the electrical connection module described in any of the above-mentioned embodiments. In an embodiment, an industrial machine, such as an industrial robot, includes the electrical connection module described in any of the above-mentioned embodiments.

It should be noted that other embodiments of the present disclosure may also include an implementable conductor structure and an electrical connection module formed by combining the technical features of the above-mentioned embodiments.

The technical features of the above-mentioned embodiments can be combined arbitrarily. To make the description concise, all possible combinations of the technical features in the above-mentioned embodiments are not described. However, as long as there is no contradiction in the combinations of these technical features, these combinations should be regarded as within the scope of the present disclosure.

The above-mentioned embodiments are merely some embodiments of the present disclosure, and the description thereof is relatively specific and detailed, but should not be construed as limiting the scope of the present disclosure. It should be noted that those skilled in the art can make several modifications and improvements without departing from the concept of the present disclosure, and these all fall within the protection scope of the present disclosure. Therefore, the scope of the protection of the present disclosure should be subject to the appended claims.

What is claimed is:

1. A conductor structure, comprising a weld leg portion, an intermediate curved portion, and a sliding insertion portion connected in sequence; wherein the weld leg portion is welded with a circuit board;

the intermediate curved portion is formed with a back-bending structure and a curved structure which are connected, the intermediate curved portion is provided with a first interference region adjacent to the weld leg portion, the first interference region is configured to be in close contact with a socket lower housing body to fix the socket lower housing body;

the sliding insertion portion is configured to conduct with a plug conductor of a plug connector, the sliding insertion portion is provided with a second interference region adjacent to the intermediate curved portion, the second interference region is configured to be in close contact with a socket upper housing body to fix the socket upper housing body;

the back-bending structure and the curved structure are configured to be floatingly exposed between the socket lower housing body and the socket upper housing body when the first interference region is in close contact with the socket lower housing body and the second interference region is in close contact with the socket upper housing body;

wherein the intermediate curved portion is sequentially provided with a first straight segment, a second curved segment, a third straight segment, a fourth curved segment, a fifth straight segment, a sixth curved segment, a seventh straight segment, an eighth curved segment, and a ninth straight segment;

the first straight segment is connected to the weld leg portion, the first straight segment is provided with the first interference region;

the second curved segment, the third straight segment, the fourth curved segment, the fifth straight segment, and the sixth curved segment jointly form the back-bending structure;

the seventh straight segment, the eighth curved segment, and the ninth straight segment jointly form the curved structure;

the ninth straight segment is connected to the sliding insertion portion;

wherein a first included angle $\alpha$ is formed between an extension direction of the first straight segment and an extension direction of the weld leg portion;

a second included angle $\beta$ is formed between an extension direction of the ninth straight segment and an extension direction of the sliding insertion portion;

a third included angles $\gamma$ is formed between the extension direction of the first straight segment and an extension direction of the third straight segment at the second curved segment;

a fourth included angle $\delta$ is formed between an extension direction of the fifth straight segment and an extension direction of the seventh straight segment at the sixth curved segment;

a fifth included angle $\varepsilon$ is formed between the extension direction of the seventh straight segment and the extension direction of the ninth straight segment at the eighth curved segment; and the first included angle $\alpha$ is greater than or equal to 90 degrees, and the second included angle $\beta$ is greater than or equal to 90 degrees, the third included angle $\gamma$ is greater than 90 degrees, the fourth included angle $\delta$ is greater than or equal to 90 degrees, and/or, the fifth included angle $\varepsilon$ is greater than or equal to 90 degrees.

2. The conductor structure according to claim 1, wherein the weld leg portion, the intermediate curved portion and the sliding insertion portion are formed in one piece; and/or, the intermediate curved portion has an R shape or has a R-shaped stretching deformation.

3. The conductor structure according to claim 1, wherein the intermediate curved portion is provided with at least one discharge hole.

4. The conductor structure according to claim 1, wherein the weld leg portion, the intermediate curved portion and the sliding insertion portion have the same thickness.

5. The conductor structure according to claim 1, wherein the extension direction of the first straight segment is parallel to the extension direction of the sliding insertion portion.

6. The conductor structure according to claim 1, wherein the first straight segment, the third straight segment, the fifth straight segment, the seventh straight segment and/or the ninth straight segment are provided with at least one width or thickness variation adjustment portion with respect to the second curved segment, the fourth curved segment, the sixth curved segment and/or the eighth curved segment.

7. The conductor structure according to claim 1, wherein the intermediate curved portion is provided with a shape variation region at a position where the straight segment is adjacent to the curved segment, the shape variation region includes a width variation region and/or a thickness variation region.

8. The conductor structure according to claim 1, wherein the first straight segment, the second curved segment, the third straight segment, the fourth curved segment, the fifth straight segment, the sixth curved segment, the seventh straight segment, the eighth curved segment, and the ninth straight segment are formed in one piece; and/or the first straight segment, the second curved segment, the third straight segment, the fourth curved segment, the fifth straight segment, the sixth curved segment, the seventh straight segment, the eighth curved segment, and the ninth straight segment have the same thickness.

9. The conductor structure according to claim 1, wherein a centerline of the back-bending structure is inclined to the extension direction of the sliding insertion portion.

10. The conductor structure according to claim 1, wherein the back-bending structure and the curved structure are located in different planes.

11. The conductor structure according to claim 1, wherein the back-bending structure deviates from a plane jointly formed by the first straight segment and the weld leg portion and is twisted with respect to the plane.

12. The conductor structure according to claim 1, wherein the sliding insertion portion is provided with a connection segment and an insertion segment which are connected, the connection segment is connected to the intermediate curved portion and is adjacent to the curved structure, the connection segment is provided with the second interference region, the insertion segment is configured to conduct with the plug conductor of the plug connector.

13. The conductor structure according to claim 12, wherein a width of the sliding insertion portion is less than or equal to a maximum width of the intermediate curved portion, the insertion segment is arranged higher than the intermediate curved portion, the weld leg portion is arranged lower than the connection segment and the intermediate curved portion.

14. The conductor structure according to claim 1, wherein widths of the first interference region and the second interference region are less than or equal to a maximum width of the intermediate curved portion.

15. An electrical connection module, comprising a socket connector provided with a socket lower housing body, a socket upper housing body, and the conductor structure in claim 1.

16. The electrical connection module according to claim 15, further comprising a plug connector matching the socket connector, wherein the plug connector is connected to the conductor structure; and/or a plurality of the conductor structures are regularly arranged in two groups, the first interference region of each conductor structure in each group is configured to be in close contact with the socket lower housing body to integrally fit and fix the socket lower housing body; the second interference region of each conductor structure in each group is configured to be in close contact with the socket upper housing body to integrally fit and fix the socket upper housing body.

* * * * *